US012681347B2

(12) United States Patent
Ning

(10) Patent No.: US 12,681,347 B2
(45) Date of Patent: Jul. 14, 2026

(54) DISPLAY MODULE AND PRODUCTION METHOD THEREOF, AND DISPLAY DEVICE

(71) Applicant: Jiangsu Tianhua Automotive Electronics Co., Ltd., Nantong (CN)

(72) Inventor: Chunli Ning, Nantong (CN)

(73) Assignee: Jiangsu Tianhua Automotive Electronics Co., Ltd., Nantong (CN)

( * ) Notice: Subject to any disclaimer, the term of this patent is extended or adjusted under 35 U.S.C. 154(b) by 0 days.

(21) Appl. No.: 19/242,661

(22) Filed: Jun. 18, 2025

(65) Prior Publication Data

US 2026/0186341 A1     Jul. 2, 2026

(30) Foreign Application Priority Data

Dec. 30, 2024     (CN) .......................... 202411981428.9

(51) Int. Cl.
  *G02F 1/00*          (2006.01)
  *G02F 1/13357*     (2006.01)
(52) U.S. Cl.
  CPC ............................. *G02F 1/133606* (2013.01)
(58) Field of Classification Search
  None
  See application file for complete search history.

(56) References Cited

U.S. PATENT DOCUMENTS

| | | | | |
|---|---|---|---|---|
| 2009/0242142 A1* | 10/2009 | Bellwood | ............... | G06F 21/84 |
| | | | | 160/127 |
| 2014/0110040 A1* | 4/2014 | Cok | ................. | C23C 16/45525 |
| | | | | 156/196 |
| 2021/0325731 A1* | 10/2021 | Li | ..................... | G02F 1/133626 |
| 2024/0069383 A1* | 2/2024 | Yang | ................. | G02F 1/133611 |
| 2025/0208453 A1* | 6/2025 | Chen | ................. | G02F 1/133528 |
| 2025/0321444 A1* | 10/2025 | Cheng | ............... | G02F 1/133531 |

FOREIGN PATENT DOCUMENTS

| | | | | |
|---|---|---|---|---|
| CN | 117471707 A | 1/2024 | | |
| WO | WO-2024132564 A1 * | 6/2024 | ......... | G02B 19/0019 |

* cited by examiner

*Primary Examiner* — Gerald J Sufleta, II
(74) *Attorney, Agent, or Firm* — Anova Law Group, PLLC

(57)          ABSTRACT
A display module includes a light-emitting module and an anti-peep component. The anti-peep component includes an anti-peep layer and a light-adjusting layer, where the light-adjusting layer is located between the anti-peep layer and the light-emitting module. The anti-peep layer includes a plurality of baffle walls, and light-transmitting portions are provided between adjacent baffle walls. The light-adjusting layer includes a plurality of light-adjusting structures, and one light-adjusting structure corresponds to at least one baffle wall. A vertical projection of a light-adjusting structure on a plane where the light-emitting module is located and a vertical projection of a corresponding baffle wall on the same plane at least partially overlap.

19 Claims, 23 Drawing Sheets

A–A'

A–A'

A–A'

A–A'

A-A'

A-A'

A-A'

A-A'

A–A'

A–A'

A-A'

A-A'

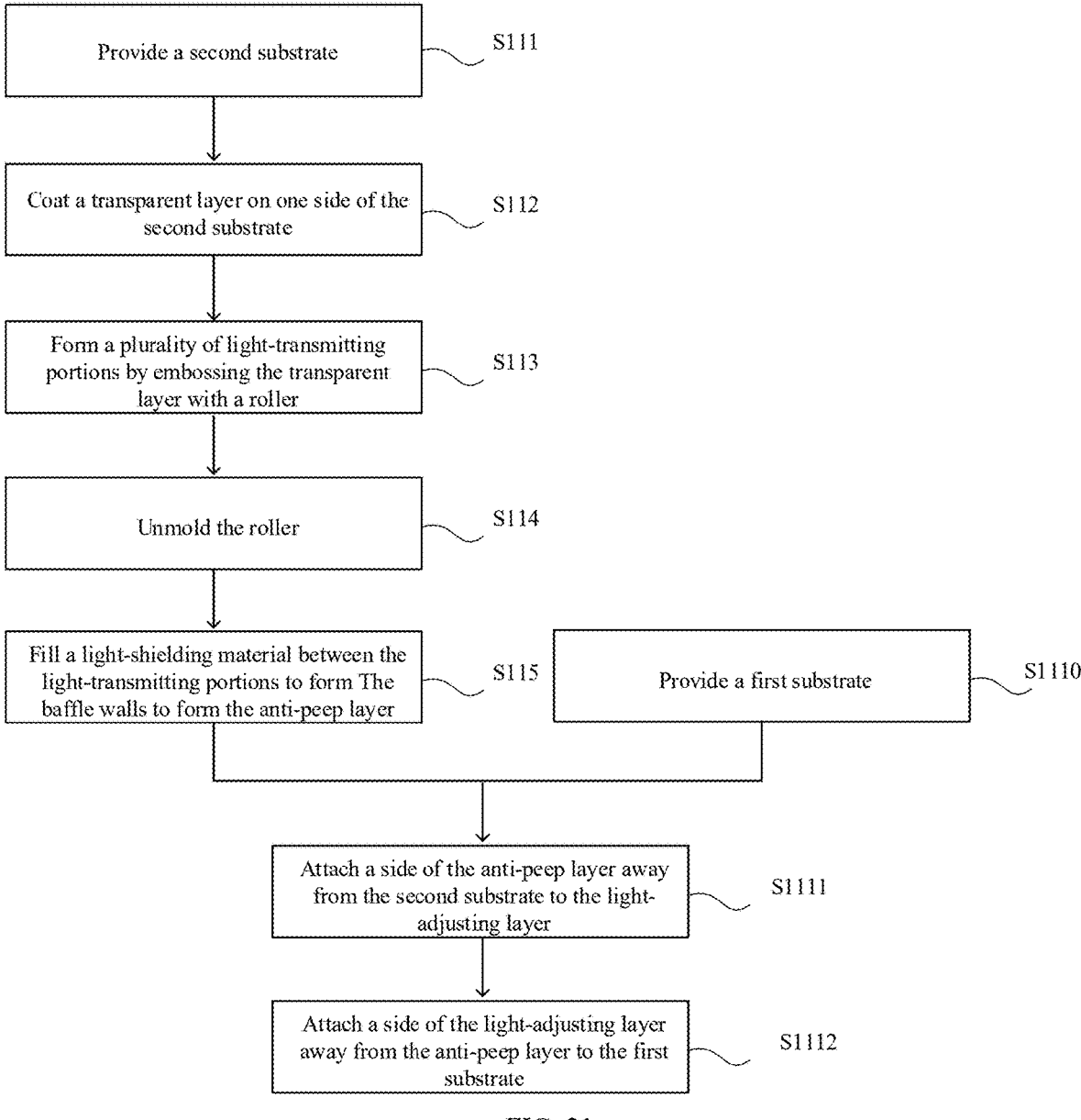

Provide a second substrate — S111

Coat a transparent layer on one side of the second substrate — S112

Form a plurality of light-transmitting portions by embossing the transparent layer with a roller — S113

Unmold the roller — S114

Fill a light-shielding material between the light-transmitting portions to form The baffle walls to form the anti-peep layer — S115

Provide a first substrate — S1110

Attach a side of the anti-peep layer away from the second substrate to the light-adjusting layer — S1111

Attach a side of the light-adjusting layer away from the anti-peep layer to the first substrate — S1112

DISPLAY MODULE AND PRODUCTION METHOD THEREOF, AND DISPLAY DEVICE

CROSS-REFERENCE TO RELATED DISCLOSURE

The present disclosure claims priority of Chinese Patent Disclosure No. 202411981428.9, filed on Dec. 30, 2024, the entire content of which is hereby incorporated by reference.

FIELD OF THE DISCLOSURE

The present disclosure relates to the field of display technology, and in particular to a display module and a production method thereof, and a display device.

BACKGROUND

With the development of display technology, various personalized needs have also received attention, and displays with anti-peep and anti-reflection functions have emerged, especially in vehicle-mounted applications. Currently, many vehicles, especially mid-to-high-end vehicles, have added anti-peep displays in their interior cockpit displays.

Most of the current anti-peep technologies set a certain grid structure of an anti-peep film in the display to achieve the anti-peep effect. However, the setting of the grid structure of the anti-peep film will affect the display effect of the display.

SUMMARY

To solve the above technical problems and other problems in the existing technologies, embodiments of the present disclosure provide a display module and a production method thereof, and a display device, which are beneficial in improving the display effect while achieving the anti-peep effect.

An embodiment the present disclosure provides a display module, and the display module includes a light-emitting module; and an anti-peep component, where anti-peep component is located on a light-emitting side of the light-emitting module, the anti-peep component includes an anti-peep layer and a light-adjusting layer, and the light-adjusting layer is located between the anti-peep layer and the light-emitting module, where the anti-peep layer includes a plurality of baffle walls, and light-transmitting portions are provided between adjacent baffle walls, and the light-adjusting layer includes a plurality of light-adjusting structures, one of the light-adjusting structures corresponds to at least one of the baffle walls, and a vertical projection of a light-adjusting structure on a plane where the light-emitting module is located and a vertical projection of a corresponding baffle wall on the plane where the light-emitting module is located at least partially overlap.

An embodiment the present disclosure also provides a method for making a display module, and the method includes forming an anti-peep component, where the anti-peep component includes an anti-peep layer and a light-adjusting layer, the anti-peep layer includes a plurality of baffle walls, light-transmitting portions are provided between adjacent baffle walls, the light-adjusting layer includes a plurality of light-adjusting structures, and one of the light-adjusting structures corresponds to at least one baffle wall; providing a light-emitting module; and attaching the anti-peep component to a light-emitting side of the light-emitting module, where the light-adjusting layer is located between the anti-peep layer and the light-emitting module, and a vertical projection of a light-adjusting structure on a plane where the light-emitting module is located and a vertical projection of a corresponding baffle wall on the plane where the light-emitting module is located at least partially overlap.

An embodiment the present disclosure also provides a display device, including a display module disclosed elsewhere herein.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated in and constitute a part of this disclosure, illustrate embodiments consistent with the present disclosure and, together with the specification, serve to explain the principles of the present disclosure.

In order to more clearly illustrate the embodiments of the present disclosure or the technical solutions in the existing technologies, the drawings essential for understanding the disclosed embodiments or the description of the existing technologies will be briefly introduced below. Apparently, for a person skilled in the art, other drawings may be obtained based on these drawings without making creative efforts.

FIG. 21 is a flow chart of another method for making an anti-peep component, according to some embodiments of the present disclosure;

DETAILED DESCRIPTION

In order to more clearly understand the objectives, features, and advantages of the present disclosure, the technical solutions of the present disclosure will be further described below. It should be noted that the embodiments of the present disclosure and the features in the embodiments may be combined with each other without conflict.

In the following descriptions, many specific details are set forth to facilitate a thorough understanding of the present disclosure, but the present disclosure may also be implemented in other ways different from those described herein. It is obvious that the embodiments in the specification are merely part of the embodiments of the present disclosure, rather than all of the embodiments.

Figure 1:
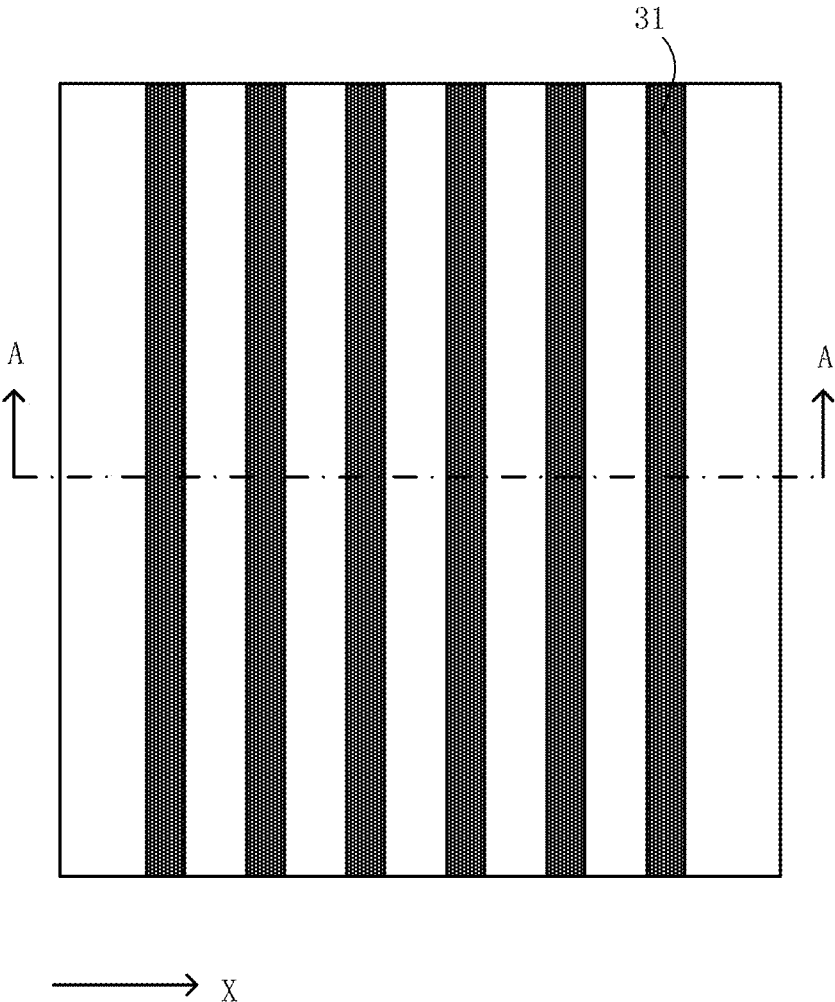
FIG. 1 is a schematic plan view of a display module, according to some embodiments of the present disclosure.
Figure 2:
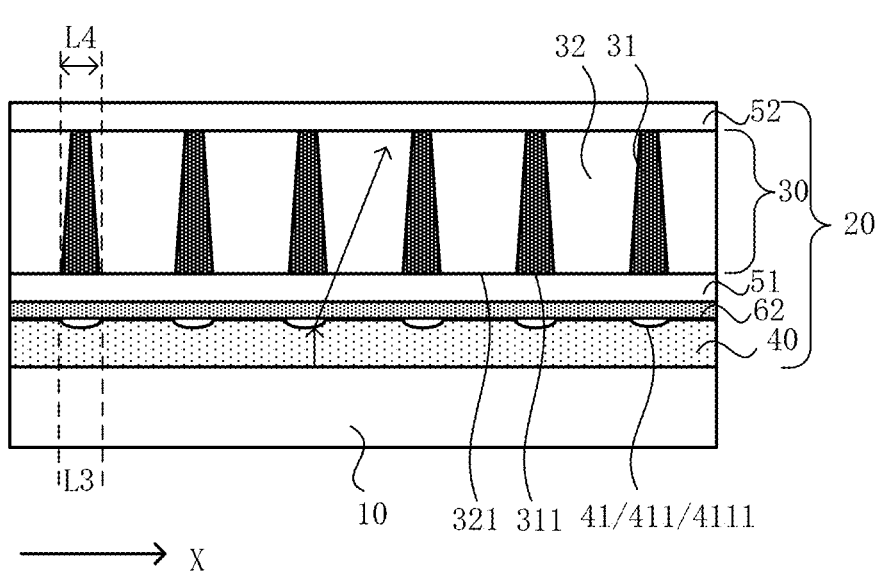
FIG. 2 is a cross-sectional view of the display module along the line AA' shown in FIG. 1.

FIG. 1 is a schematic plan view of a display module, according to some embodiments of the present disclosure, and FIG. 2 is a cross-sectional view of the display module along an AA' line shown in FIG. 1. With reference to FIGS. 1 and 2, embodiments of the present disclosure provide a display module, and the display module includes a light-emitting module 10 and an anti-peep component 20.

The anti-peep component 20 is located at the light-emitting side of the light-emitting module 10. The anti-peep component 20 includes an anti-peep layer 30 and a light-adjusting layer 40. The light-adjusting layer 40 is located between the anti-peep layer 30 and the light-emitting module 10.

The anti-peep layer 30 includes a plurality of baffle walls 31, and light-transmitting portions 32 are provided between adjacent baffle walls 31.

The light-adjusting layer 40 includes multiple light-adjusting structures 41, and one light-adjusting structure 41 corresponds to at least one baffle wall 31. The vertical projection of a light-adjusting structure 41 on a plane where the light-emitting module 10 is located and the vertical projection of the corresponding baffle wall 31 on the plane where the light-emitting module 10 is located at least partially overlap. The light-adjusting structure 41 is configured to change the path of at least part of the light emitted toward the corresponding baffle wall(s) 31 so that the part of the light is emitted toward the light-transmitting portions 32.

Specifically, the display module provided by the embodiments of the present disclosure includes a light-emitting module 10 and an anti-peep component 20, where the anti-peep component 20 is disposed on the light-emitting side of the light-emitting module 10. Optionally, when the display module is a liquid crystal display module, the light-emitting module 10 may be a backlight source. The display module also includes a liquid crystal display panel, which is located on the light-emitting side of the backlight source. The anti-peep component 20 may be disposed on both sides of the liquid crystal display panel in a direction perpendicular to a plane where the backlight source is located. For example, the anti-peep component 20 may be disposed between the backlight source and the liquid crystal display panel, or on the side of the liquid crystal display panel away from the backlight source. Optionally, when the display module is an organic light-emitting display module or a micro-luminescent display module, the light-emitting module 10 is an organic light-emitting display panel, and the anti-peep component 20 is disposed on the light-emitting side of the organic light-emitting display panel.

It should be noted that, in some embodiments of the present disclosure, the light-emitting module 10 may also be other light-emitting devices, and the anti-peep component 20 may also be configured to be disposed on the light-emitting side of other light-emitting devices, which will not be described in detail in the present disclosure.

The anti-peep component 20 includes an anti-peep layer 30, and the anti-peep layer 30 includes a plurality of baffle walls 31, and light-transmitting portions 32 are provided between adjacent baffle walls 31. The material of a light-transmitting portion 32 is a transparent material. A baffle wall 31 is a black light-absorbing structure, and the light incident on the baffle wall 31 may be absorbed. Optionally, the baffle wall 31 may be a graphic adhesive layer mixed with a black additive. The black additive may be carbon powder or other black material powder. The light incident on the anti-peep layer 30 is propagated based on the light-transmitting portions 32 between adjacent baffle walls 31, thereby limiting the transmission directions and transmission angles of the light emitted through the anti-peep layer 30, so that the display module has an anti-peep function.

Part of the light directed toward the anti-peep component 20 is directly directed toward the light-transmitting portions 32, and part of the light is directed toward the surfaces 311 of the baffle walls 31 close to the light-emitting module 10. The anti-peep component 20 further includes a light-adjusting layer 40, which is located between the anti-peep layer 30 and the light-emitting module 10. That is, the light emitted by the light-emitting module 10 is directed toward the anti-peep layer 30 through the light-adjusting layer 40. The light-adjusting layer 40 includes a plurality of light-adjusting structures 41, where one light-adjusting structure 41 corresponds to at least one baffle wall 31. A vertical projection of a light-adjusting structure 41 on the plane where the light-emitting module 10 is located and a vertical projection of the corresponding baffle wall(s) 31 on the plane where the light-emitting module 10 is located at least partially overlap. A light-adjusting structure 41 is configured to change the path of at least part of the light emitted toward the corresponding baffle wall(s) 31 so that the part of the light is emitted toward the light-transmitting portions 32. That is, through the setting of the light-adjusting structures 41, the path of part of the light originally emitted toward the surfaces 311 of the baffle walls 31 close to the light-emitting module 10 is changed, so that the part of the light is emitted toward the light-transmitting portions 32. This is beneficial in increasing the amount of light emitted into the light-transmitting portions 32, thereby improving the transmittance of light, the display brightness, and the display effect.

Continuing to refer to FIGS. 1 and 2, in some embodiments, a light-adjusting structure 41 includes a first light-adjusting structure 411.

Along a direction perpendicular to the plane where the light-emitting module 10 is located, a surface located on at least one side of the first light-adjusting structure 411 includes a first curved surface portion 4111, where the first curved surface portion 4111 is concave toward the interior of the light-adjusting layer 40, and the first curved surface portion 4111 forms a concave lens.

The vertical projection of the surface 311 of a baffle wall 31 close to the light-emitting module 10 on the plane where the light-emitting module 10 is located and the vertical projection of the corresponding first curved surface portion 4111 on the plane where the light-emitting module 10 is located at least partially overlap.

Specifically, a light-adjusting structure 41 includes a first light-adjusting structure 411. Along the direction perpendicular to the plane where the light-emitting module 10 is located, the surface located on at least one side of the first light-adjusting structure 411 includes a first curved surface portion 4111. The first curved surface portion 4111 is concave toward the interior of the light-adjusting layer 40. The first curved surface portion 4111 forms a concave lens, which has a divergent effect on light. The vertical projection of the surface of the side of a baffle wall 31 close to the light-emitting module 10 on the plane where the light-emitting module 10 is located and the vertical projection of the corresponding first curved surface portion 4111 on the plane where the light-emitting module 10 is located at least partially overlap. Accordingly, the light originally directed toward the surface 311 of the side of the baffle wall 31 close to the light-emitting module 10 is diverged by the first curved surface portion 4111. Part of the light will change the path and be directed toward the light-transmitting portions 32, which is conducive to increasing the amount of light entering the light-transmitting portions 32, thereby facilitating the light transmittance, display brightness, and display effect.

Figure 3:
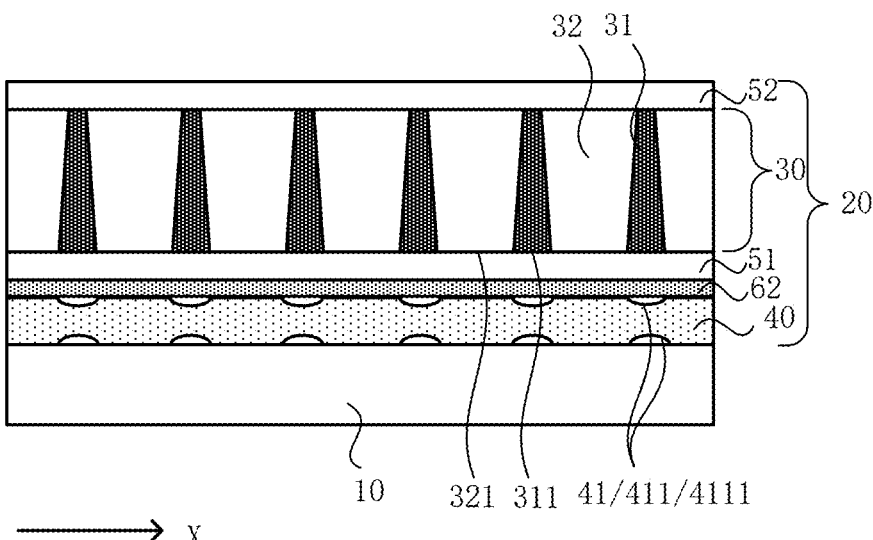
FIG. 3 is another cross-sectional view of the display module along the line AA' shown in FIG. 1.
Figure 4:
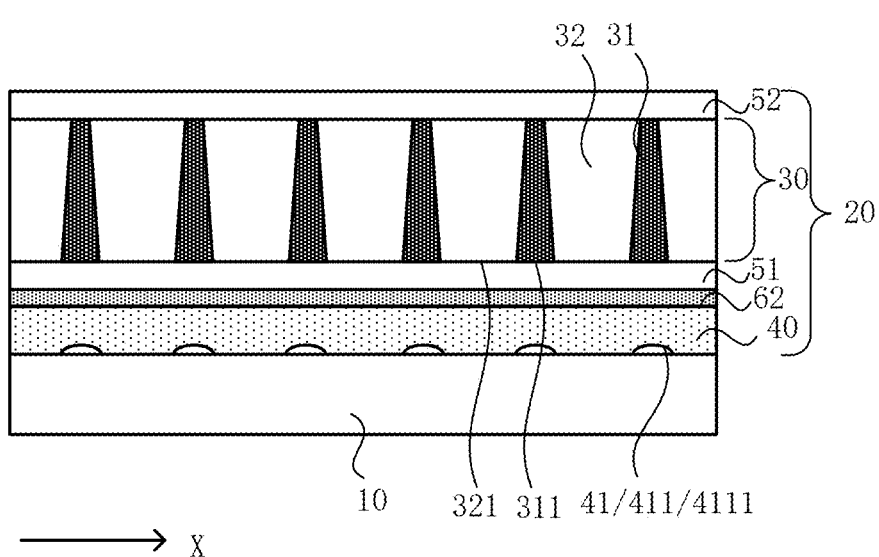
FIG. 4 is another cross-sectional view of the display module along the line AA' shown in FIG. 1.

It should be noted that FIG. 2 merely exemplarily shows that the surface of the light-adjusting layer 40 close to the anti-peep layer 30 is provided with first curved surface portions 4111. FIG. 3 is another cross-sectional view of the display module along the AA' line shown in FIG. 1. The first curved surface portions 4111 may be provided on the surfaces on both sides of the first light-adjusting structure 411 along the direction perpendicular to the plane where the light-emitting module 10 is located. FIG. 4 is another cross-sectional view of the display module along the AA' line shown in FIG. 1. The first curved surface portions 4111 may be provided merely on the surface of the light-adjusting layer 40 away from the anti-peep layer 30. The present disclosure will not go into detail here.

Continuing to refer to FIGS. 1 and 2, in some embodiments, the baffle walls 31 are disposed along the first direction X.

The width of a first curved surface portion 4111 along the first direction X is less than or equal to the width of the surface 311 of the corresponding baffle wall 31 close to the light-emitting module 10 along the first direction X.

Specifically, the baffle walls 31 are disposed along the first direction X. The width of a first curved surface portion 4111 along the first direction X is designed to be L3, and the width of the surface 311, of a baffle wall 31 corresponding to the first curved surface portion 4111, on the side close to the light-emitting module 10, along the first direction X is L4, and L3 is less than or equal to L4. That is, the vertical projection of the first curved surface portion 4111 on the plane where the light-emitting module 10 is located and the vertical projection of the surface 311 of the baffle wall 31, corresponding to the first curved surface portion 4111 on the side close to the light-emitting module 10 on the plane where the light-emitting module 10 is located, at least partially overlap. In addition, the vertical projection of the first curved surface portion 4111 on the plane where the light-emitting module 10 is located does not overlap with the vertical projection of the surface 321 of the corresponding light-transmitting portion 32 close to the light-emitting module 10 on the plane in which the light-emitting module 10 is located. Accordingly, the first curved surface portion 4111 may diverge the light originally emitted toward the surface 311 of the baffle wall 31 close to the light-emitting module 10. Meanwhile, the influence of the setting of the first curved surface portion 4111 on the light originally emitted to the light-transmitting portions 32 is avoided. This is beneficial in increasing the amount of light incident on the light-transmitting portions 32, thereby helping to improve the transmittance of light, improving the display brightness, and improving the display effect.

It should be noted that the radius of curvature of the first curved surface portion 4111 and the height of the first curved surface portion 4111 in a direction perpendicular to the plane where the light-emitting module 10 is located may be set according to actual production needs, which is not specifically limited in the present disclosure.

Figure 5:
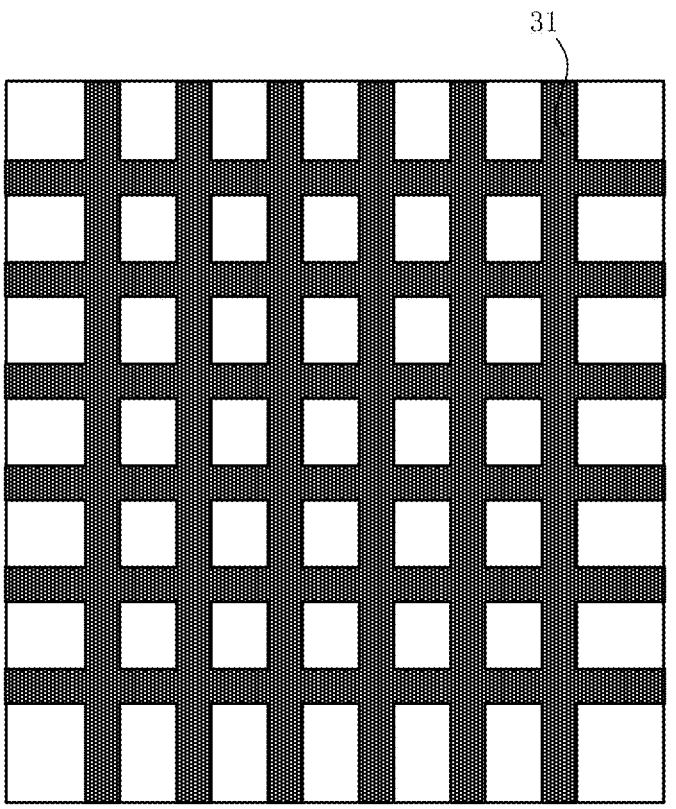
FIG. 5 is a plan view of another display module, according to some embodiments of the present disclosure.

It should be noted that FIGS. 1 and 2 exemplarily show that the baffle walls 31 are disposed along the first direction X. In some embodiments of the present disclosure, the baffle walls 31 may also be other structures. For example, refer to FIG. 5, which is a plan view of another display module, according to some embodiments of the present disclosure. The baffle walls 31 may also be a grid structure, which will not be elaborated in the present disclosure.

Figure 6:
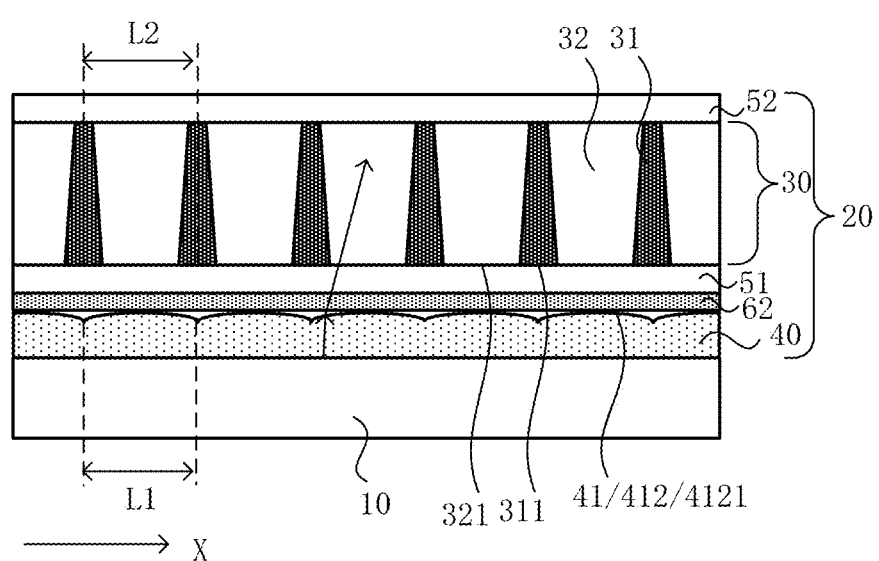
FIG. 6 is another cross-sectional view of the display module along the line AA' shown in FIG. 1.

FIG. 6 is another cross-sectional view of the display module along the AA' line shown in FIG. 1. Referring to FIGS. 1 and 6, in some embodiments, the light-adjusting structure 41 includes a second light-adjusting structure 412.

Along a direction perpendicular to the plane where the light-emitting module 10 is located, a surface located on at least one side of the second light-adjusting structure 412 includes a second curved surface portion 4121, the second curved surface portion 4121 is convex in a direction away from the interior of the light-adjusting layer 40, and the second curved surface portion 4121 forms a convex lens.

The vertical projection of the second curved surface portion 4121 on the plane where the light-emitting module 10 is located and the vertical projection of a corresponding light-transmitting portion 32 on the plane where the light-emitting module 10 is located at least partially overlap. The vertical projection of the second curved surface portion 4121 on the plane where the light-emitting module 10 is located and the vertical projection of the surface 311 of a corresponding baffle wall(s) 31 on the side close to the light-emitting module 10 on the plane where the light-emitting module 10 is located at least partially overlap.

Specifically, the light-adjusting structure 41 includes a second light-adjusting structure 412. Along a direction perpendicular to the plane where the light-emitting module 10 is located, the surface on at least one side of the second light-adjusting structure 412 includes a second curved surface portion 4121. The second curved surface portion 4121 is convex in a direction away from the interior of the light-adjusting layer 40. The second curved surface portion 4121 forms a convex lens, which has the effect of converging light. The vertical projection of the second curved surface portion 4121 on the plane where the light-emitting module 10 is located and the vertical projection of the corresponding light-transmitting portion 32 on the plane where the light-emitting module 10 is located at least partially overlap. The vertical projection of the second curved surface portion 4121 on the plane where the light-emitting module 10 is located and the vertical projection of the surface 311 of the side of the corresponding baffle wall(s) 31 close to the light-emitting module 10 on the plane where the light-emitting module 10 is located at least partially overlap. That is, the second curved surface portion 4121 may converge the light incident on the light-entering side of the anti-peep layer 30 toward the normal direction close to the second curved surface portion 4121, and the normal of the second curved surface portion 4121 extends through an area corresponding to the light-transmitting portion 32. The second curved surface portion 4121 may thus change the path of part of the light originally directed toward the surface(s) 311 of the side of the baffle wall(s) 31 close to the light-emitting module 10, so that part of the light is directed toward the corresponding light-transmitting portion 32. This is beneficial in increasing the amount of light entering the light-transmitting portions 32, thereby facilitating the improvement of the light transmittance, the display brightness, and the display effect. In addition, when the baffle walls 31 are made of light-absorbing material, part of the light that may originally enter the light-transmitting portions 32 will eventually be absorbed by the baffle walls 31 due to the larger angle and cannot be emitted. However, in the embodiments of the present disclosure, the second curved surface portion 4121 overlaps with the corresponding light-transmitting portion 32, which may further reduce the angle of the aforementioned light and increase the amount of light that may be emitted, thereby improving the display brightness.

Figure 7:
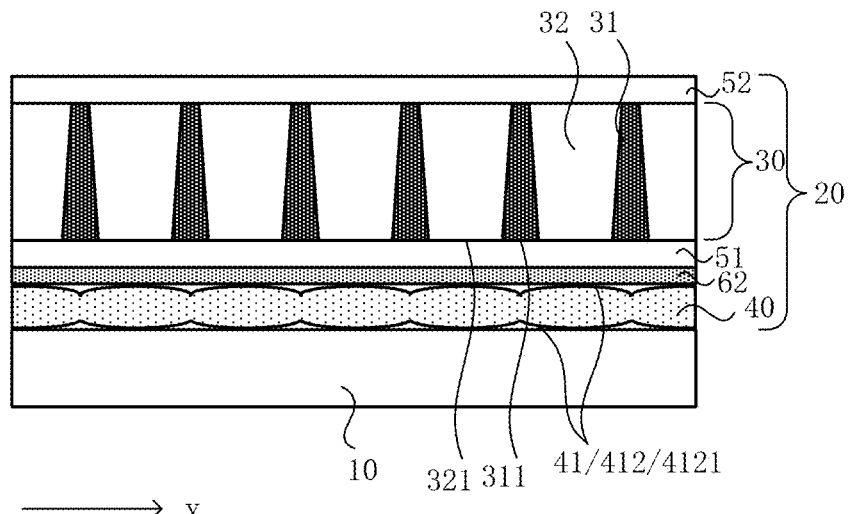
FIG. 7 is another cross-sectional view of the display module along the line AA' shown in FIG. 1.
Figure 8:
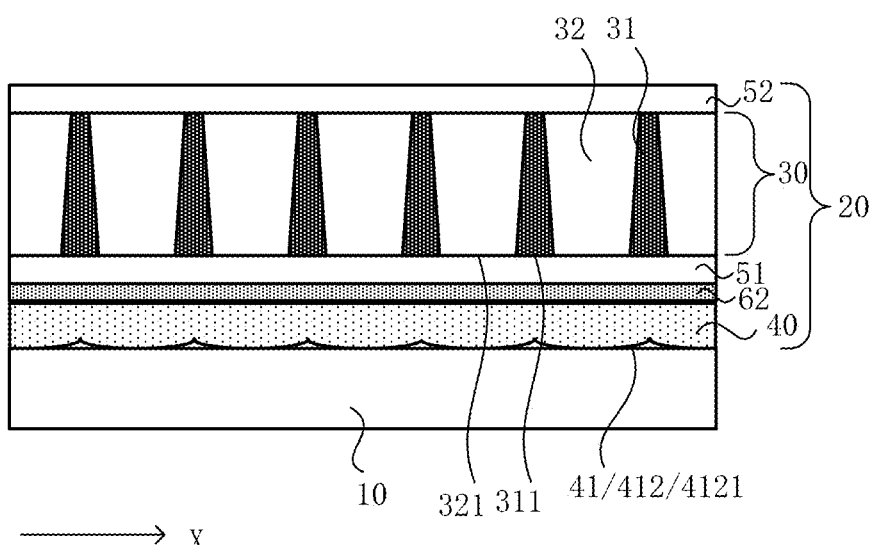
FIG. 8 is another cross-sectional view of the display module along the line AA' shown in FIG. 1.

It should be noted that FIG. 6 merely exemplarily shows that the surface of the light-adjusting layer 40 adjacent to the anti-peep layer 30 is provided with the second curved surface portions 4121. FIG. 7 is another cross-sectional view of the display module along the AA' line shown in FIG. 1. The second curved surface portions 4121 may be provided on the surfaces on both sides of the first light-adjusting structure 411 along the direction perpendicular to the plane where the light-emitting module 10 is located. FIG. 8 is another cross-sectional view of the display module along the AA' line shown in FIG. 1. The second curved surface portions 4121 may also be provided merely on the surface of the light-adjusting layer 40 away from the anti-peep layer 30. The present disclosure will not go into detail here.

Continuing to refer to FIGS. 1 and 6, in some embodiments, the baffle walls 31 are disposed along the first direction X.

The width of the second curved surface portion 4121 along the first direction X is L1, and the distance between the centers of the surfaces 311 of two adjacent baffle walls 31 close to the light-emitting module 10 along the first direction X is L2, where, L1≤L2.

Specifically, the baffle walls 31 are disposed along the first direction X, and the width of a second curved surface portion 4121 along the first direction X is designed to be less than or equal to the distance, between the centers of the surfaces 311 of the two adjacent baffle walls 31 close to the light-emitting module 10, along the first direction X. That is, the vertical projection of the second curved surface portion 4121 on the plane where the light-emitting module 10 is located and the vertical projection of the surface(s) 311 of the corresponding baffle wall(s) 31 close to the light-emitting module 10 on the plane where the light-emitting module 10 is located at least partially overlap. The normal of the second curved surface portion 4121 extends through an area corresponding to the light-transmitting portion 32, so that the second curved surface portion 4121 may change the path of part of the light originally emitted toward the surface(s) 311 of the baffle wall(s) 31 close to the light-emitting module 10, so that part of the light is emitted to the light-transmitting portion 32. Meanwhile, the second curved surface portion 4121 may correspond one-to-one with the light-transmitting portion 32, and the settings of adjacent second curved surface portions 4121 do not affect each other.

It should be noted that the radius of curvature of the second curved surface portion 4121 and the height of the second curved surface portion 4121 in a direction perpendicular to the plane where the light-emitting module 10 is located may be set according to actual production needs, which is not specifically limited in the present disclosure.

Continuing to refer to FIGS. 1 and 2, in some embodiments, the anti-peep component 20 also includes a first substrate 51 and a second substrate 52 that are relatively arranged. The first substrate 51 is located between the anti-peep layer 30 and the light-adjusting layer 40, and the second substrate 52 is located on the side of the anti-peep layer 30 away from the light-emitting module 10.

Specifically, the anti-peep component 20 further includes a first substrate 51 and a second substrate 52 that are arranged opposite to each other. In a direction perpendicular to the plane where the light-emitting module 10 is located, the first substrate 51 and the second substrate 52 are respectively located on both sides of the anti-peep layer 30, and the second substrate 52 is located on the side of the anti-peep layer 30 away from the light-emitting module 10. The first substrate 51 and the second substrate 52 may support and protect the anti-peep layer 30, thereby ensuring the structural stability of the anti-peep layer 30 and extending its service life. The first substrate 51 is located between the anti-peep layer 30 and the light-adjusting layer 40. That is, the light-adjusting layer 40 may be bonded to the side of the first substrate 51 away from the anti-peep layer 30, thereby achieving a configuration of the light-adjusting layer 40 in the anti-peep component 20.

It should be noted that the light-adjusting layer 40 may be directly and fully bonded to the surface of the first substrate 51 away from the anti-peep layer 30, or an air layer may also be provided between the light-adjusting layer 40 and the first substrate 51, which will not be elaborated in the present disclosure.

It should be noted that FIG. 2 exemplarily shows the structure of the display module when the light-adjusting layer 40 includes a first light-adjusting structure 411. In some embodiments of the present disclosure, the light-adjusting layer 40 may further include a second light-adjusting structure 412. In this case, the structure of the display module may refer to FIG. 6, and the present disclosure will not elaborate on it here.

Figure 9:
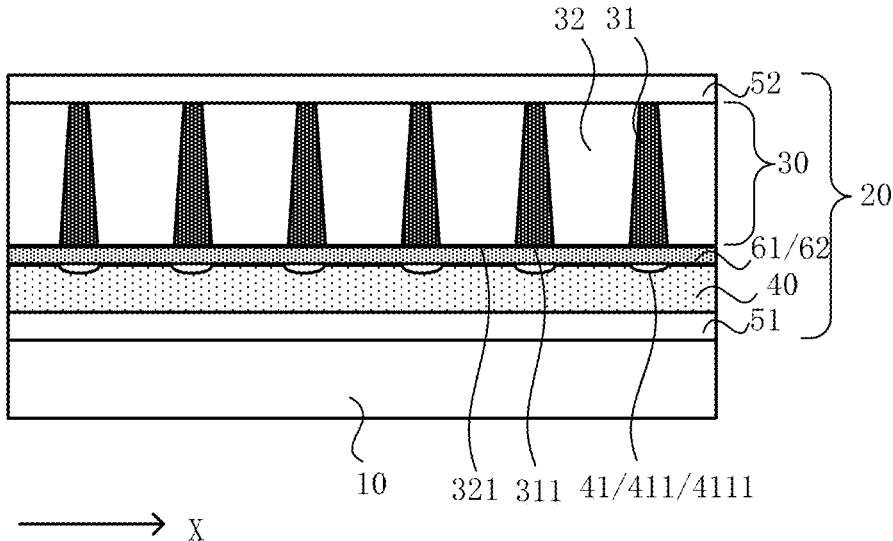
FIG. 9 is another cross-sectional view of the display module along the line AA' shown in FIG. 1.

FIG. 9 is another cross-sectional view of the display module along the AA' line shown in FIG. 1. Referring to FIGS. 1 and 9, in some embodiments, the anti-peep component 20 further includes a first substrate 51 and a second substrate 52 that are arranged opposite to each other. The first substrate 51 is located on a side of the light-adjusting layer 40 close to the light-emitting module 10, and the second substrate 52 is located on a side of the anti-peep layer 30 away from the light-emitting module 10.

An isolation layer 61 is disposed between the light-adjusting layer 40 and the anti-peep layer 30.

Specifically, the anti-peep component 20 also includes a first substrate 51 and a second substrate 52 that are relatively arranged. The first substrate 51 is located on the side of the light-adjusting layer 40 close to the light-emitting module 10. The light-adjusting layer 40 may be bonded to the side of the anti-peep layer 30 away from the second substrate 52, so that the light-adjusting layer 40 may be configured in the anti-peep component 20. The second substrate 52 is located on the side of the anti-peep layer 30 away from the light-emitting module 10. The first substrate 51 and the second substrate 52 may support and protect the anti-peep layer 30 and the light-adjusting layer 40, thereby ensuring the structural stability of the anti-peep layer 30 and the light-adjusting layer 40 and extending the service life.

Figure 10:
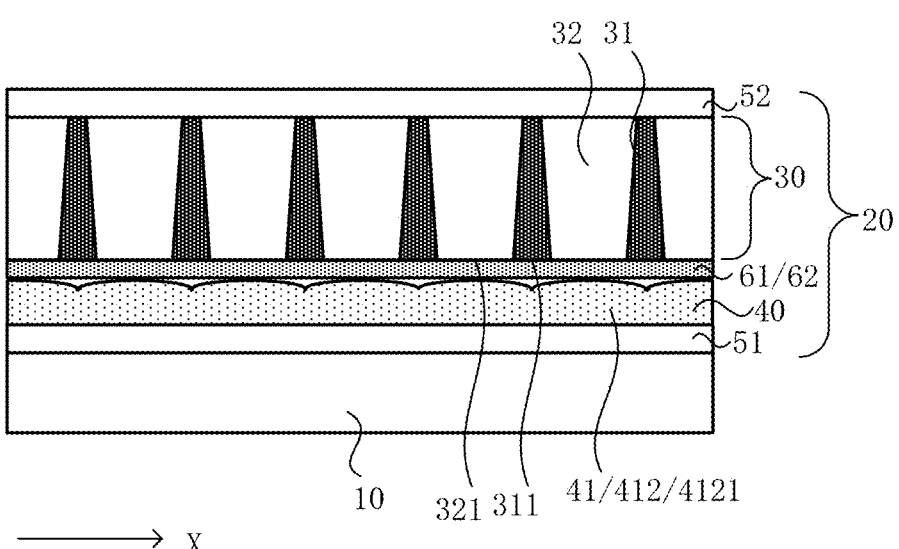
FIG. 10 is another cross-sectional view of the display module along the line AA' shown in FIG. 1.

An isolation layer 61 is provided between the light-adjusting layer 40 and the anti-peep layer 30. The material of the isolation layer 61 may be a transparent material. The provision of the isolation layer 61 is conducive to increasing the distance between the light-adjusting layer 40 and the anti-peep layer 30, so that the light emitted by the light-emitting module 10, which was originally directed toward the surfaces 311 of the side of the baffle walls 31 close to the light-emitting module 10, changes its path through the light-adjusting structures 41. Accordingly, more light is directed toward the light-transmitting portions 32, which is conducive to increasing the number of light rays entering the light-transmitting portions 32, thereby facilitating the light transmittance, display brightness, and display effect. Specifically, the isolation layer 61 may be a transparent optical glue, which is applied on one side of the light-adjusting layer 40 and then bonded to the anti-peep layer 30. At this time, the optical glue will fill the concave parts of the light-adjusting layer 40. It should be noted that FIG. 9 exemplarily shows the structure of the display module when the light-adjusting layer 40 includes the first light-adjusting structures 411. In some embodiments of the present disclosure, the light-adjusting layer 40 may include second light-adjusting structures 412. In this case, the structure of the display module may refer to FIG. 10, which is another cross-sectional view of the display module along the AA' line shown in FIG. 1, and the present disclosure will not elaborate on it here.

Figure 11:
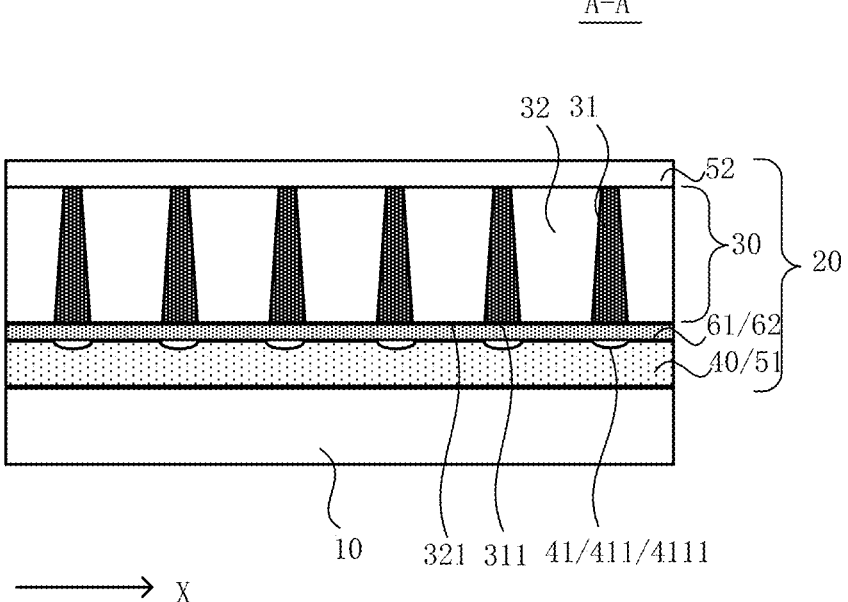
FIG. 11 is another cross-sectional view of the display module along the line AA' shown in FIG. 1.

FIG. 11 is another cross-sectional view of the display module along the AA' line shown in FIG. 1. Referring to FIGS. 1 and 11, in some embodiments, the anti-peep component 20 further includes a first substrate 51 and a second substrate 52 that are arranged opposite to each other, the first substrate 51 is located on a side of the anti-peep layer 30 close to the light-emitting module 10, and the second substrate 52 is located on a side of the anti-peep layer 30 away from the light-emitting module 10.

The light-adjusting layer 40 is multiplexed as the first substrate 51, and an isolation layer 61 is disposed between the light-adjusting layer 40 and the anti-peep layer 30.

Specifically, the anti-peep component 20 further includes a first substrate 51 and a second substrate 52 which are arranged opposite to each other. The first substrate 51 is located on the side of the anti-peep layer 30 close to the light-emitting module 10, and the second substrate 52 is located on the side of the anti-peep layer 30 away from the light-emitting module 10. The light-adjusting layer 40 is multiplexed as the first substrate 51. That is, the light-adjusting layer 40 may be bonded to the side of the anti-peep layer 30 away from the second substrate 52, so that the light-adjusting layer 40 may be configured in the anti-peep component 20. The light-adjusting layer 40 and the second substrate 52 may support and protect the anti-peep layer 30, ensure the structural stability of the anti-peep layer 30, and extend the service life. Meanwhile, the light-adjusting layer 40 is multiplexed as the first substrate 51, which is conducive to reducing the thickness of the anti-peep component 20, thereby helping to reduce the thickness of the display module.

An isolation layer 61 is provided between the light-adjusting layer 40 and the anti-peep layer 30. The material of the isolation layer 61 may be a transparent material. The provision of the isolation layer 61 is beneficial to increasing the distance between the light-adjusting layer 40 and the anti-peep layer 30. Accordingly, the light originally emitted by the light-emitting module 10 and directed toward the surfaces 311 of the baffle walls 31 close to the light-emitting module 10 changes its path through the light-adjusting structures 41, so that more light is directed toward the light-transmitting portions 32. This is beneficial in increasing the amount of light entering the light-transmitting portions 32, thereby helping to improve the transmittance of light, improve the display brightness, and improve the display effect.

It should be noted that FIG. 11 exemplarily shows the structure of the display module when the light-adjusting layer 40 includes first light-adjusting structures 411. In some embodiments of the present disclosure, the light-adjusting layer 40 may include second light-adjusting structures 412. In this case, the structure of the display module may refer to FIG. 12, which is another cross-sectional view of the display module along the AA' line shown in FIG. 1, and the present disclosure will not elaborate on it here.

Figure 12:
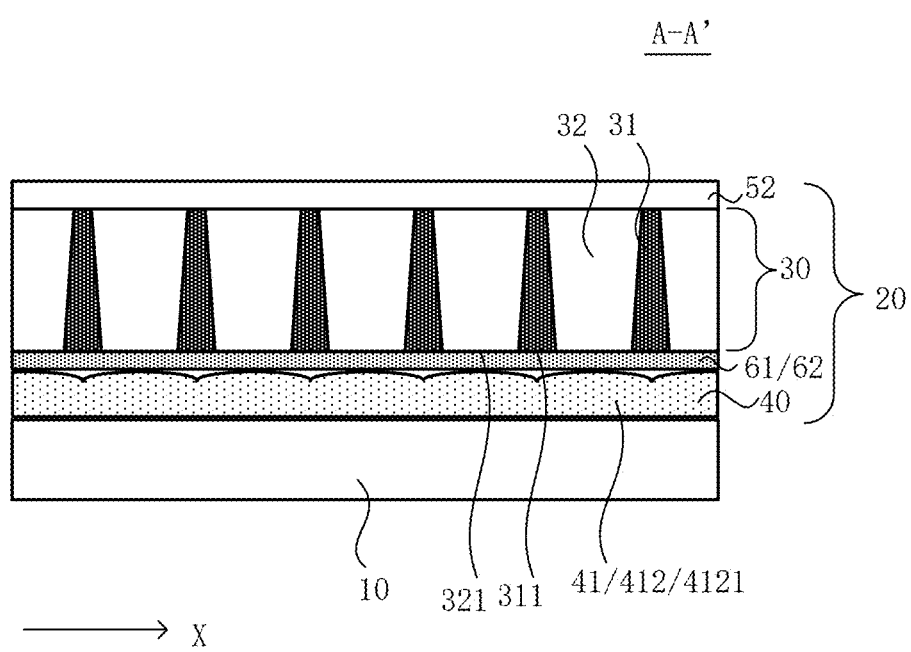
FIG. 12 is another cross-sectional view of the display module along the line AA' shown in FIG. 1.

Continuing to refer to FIGS. 11 and 12, in some embodiments, an adhesive layer 62 is provided between the light-adjusting layer 40 and the anti-peep layer 30, and the adhesive layer 62 is multiplexed as an isolation layer 61.

Specifically, the light-adjusting layer 40 may be bonded to the side of the anti-peep layer 30 away from the second substrate 52 through the adhesive layer 62, so that the light-adjusting layer 40 may be configured in the anti-peep component 20. The adhesive layer 62 is multiplexed as the isolation layer 61, which is conducive to reducing the thickness of the anti-peep component 20, thereby helping to reduce the thickness of the display module.

Figure 13:
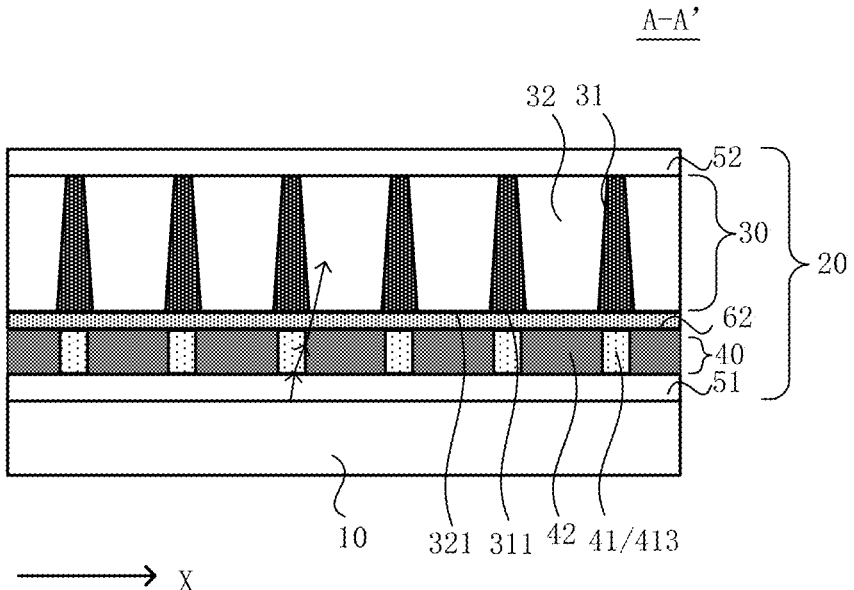
FIG. 13 is another cross-sectional view of the display module along the line AA' shown in FIG. 1.

FIG. 13 is another cross-sectional view of the display module along the AA' line shown in FIG. 1. Referring to FIGS. 1 and 13, in some embodiments, the light-adjusting structure 41 includes a third light-adjusting structure 413.

The anti-peep component 20 further includes a first substrate 51, which is located on a side of the light-adjusting layer 40 close to the light-emitting module 10.

The refractive index of a third light-adjusting structure 413 is smaller than the refractive index of the first substrate 51.

Specifically, the anti-peep component 20 also includes a first substrate 51, which is located on a side of the light-adjusting layer 40 close to the light-emitting module 10. The light-adjusting structure 41 includes a third light-adjusting structure 413. At least part of the light originally emitted toward the surfaces 311 of the baffle walls 31 close to the light-emitting module 10 is first emitted to the interface between the third light-adjusting structures 413 and the first substrate 51. Since the refractive index of the third light-adjusting structures 413 is smaller than the refractive index of the first substrate 51, part of the light originally emitted toward the surfaces 311 of baffle walls 31 close to the light-emitting module 10 is refracted and deflected toward a direction close to the light-transmitting portions 32. Accordingly, the light originally emitted toward the surfaces 311 of the baffle walls 31 close to the light-emitting module 10 is emitted to the light-transmitting portions 32. This is beneficial in increasing the amount of light emitted into the light-transmitting portions 32, thereby facilitating the improvement of the light transmittance, the display brightness, and the display effect.

Optionally, the material of the first substrate 51 may be polyethylene terephthalate, polycarbonate, etc. The material of the third light-adjusting structure 413 may be Teflon, plastic, OverCoat (OC) organic film, silicon nitride, etc. Apparently, in some embodiments of the present disclosure, the first substrate 51 and the third light-adjusting structure 413 may also be other materials, which will not be described in detail in the present disclosure.

Figure 14:
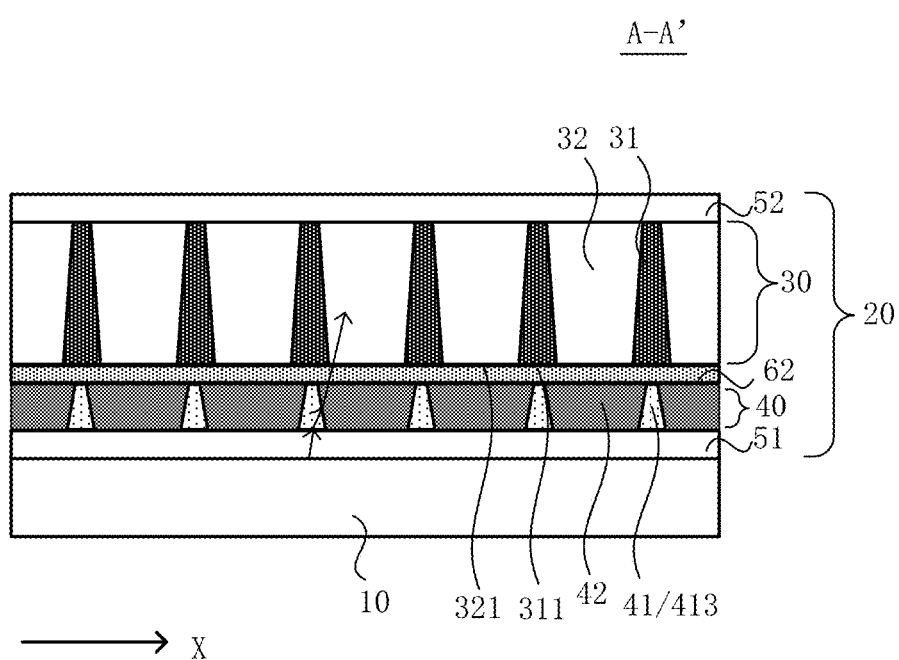
FIG. 14 is another cross-sectional view of the display module along the line AA' shown in FIG. 1.

It should be noted that FIG. 13 merely exemplarily shows that the cross-section of the third light-adjusting structure 413 is a rectangle. FIG. 14 is another cross-sectional view of the display module along the AA' line shown in FIG. 1, where the cross-section of the third light-adjusting structure 413 may also be a trapezoid. Apparently, the cross-section of the third light-adjusting structure 413 may also be other shapes such as a triangle, an inverted trapezoid, an inverted triangle, etc., which will not be described one by one in the present disclosure.

Continuing to refer to FIGS. 1 and 13, in some embodiments, the vertical projection of a third light-adjusting structure 413 on the plane where the light-emitting module 10 is located and the vertical projection of the surface of the corresponding baffle wall 31 close to the light-emitting module 10 on the plane where the light-emitting module 10 is located at least partially overlap.

Specifically, the vertical projection of a third light-adjusting structure 413 on the plane where the light-emitting module 10 is located and the vertical projection of the corresponding baffle wall 31 on the plane where the light-emitting module 10 is located at least partially overlap, so that at least part of the light originally emitted toward the surface 311 of the baffle wall 31 close to the light-emitting module 10 is first emitted to the interface between the third light-adjusting structure 413 and the first substrate 51. Since the refractive index of the third light-adjusting structure 413 is less than the refractive index of the first substrate 51, part of the light originally emitted toward the surface 311 of a baffle wall 31 close to the light-emitting module 10 is refracted and deflected toward a direction close to the light-transmitting portions 32. Accordingly, the light originally emitted toward the surface 311 of the baffle wall 31 close to the light-emitting module 10 is emitted to the light-transmitting portions 32. This is beneficial in increasing the amount of light entering the light-transmitting portions 32, thereby facilitating the improvement of the light transmittance, the display brightness, and the display effect.

Continuing to refer to FIGS. 1 and 13, in some embodiments, the light-adjusting layer 40 further includes light-adjusting portions 42, and the light-adjusting portions 42 are at least filled between the third light-adjusting structures 413, and a refractive index of a light-adjusting portion 42 is different from a refractive index of the third light-adjusting structures 413.

Specifically, the light-adjusting layer 40 further includes light-adjusting portions 42, and the light-adjusting portions 42 are at least filled between the third light-adjusting structures 413, so as to improve the flatness of the light-adjusting layer 40, facilitate the bonding of the light-adjusting layer 40 and other film layers, and improve the reliability of the light-adjusting layer 40. The refractive index of the light-adjusting portions 42 is different from the refractive index of the third light-adjusting structures 413, so that when the light is incident on the interface between a third light-adjusting structure 413 and a light-adjusting portion 42, the light will be refracted. Accordingly, more light enters the light-transmitting portions 32, so as to increase the amount of light entering the light-transmitting portions 32, so as to improve the transmittance of light, improve the display brightness, and improve the display effect.

Figure 15:
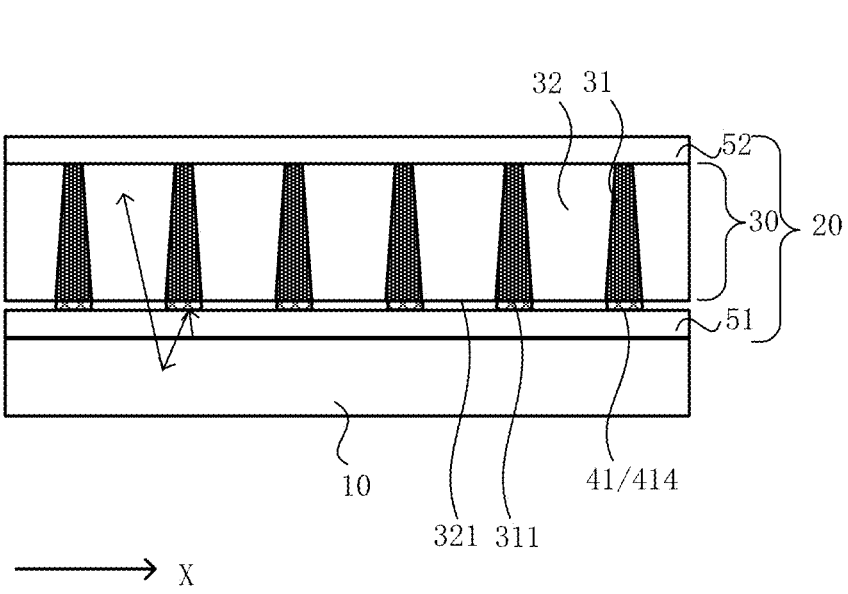
FIG. 15 is another cross-sectional view of the display module along the line AA' shown in FIG. 1.

FIG. 15 is another cross-sectional view of the display module along the AA' line shown in FIG. 1. Referring to FIGS. 1 and 15, in some embodiments, a light-adjusting structure 41 includes a reflective part 414, and the reflective part 414 is located on the surface of the corresponding baffle wall 31 close to the light-emitting module 10.

Specifically, a light-adjusting structure 41 includes a reflective part 414, and the reflective part 414 is provided on the surface 311 of a baffle wall 31 close to the light-emitting module 10. The light originally emitted toward the surface 311 of the baffle wall 31 close to the light-emitting module 10 will first be emitted to the reflective part 414 on the surface 311 of the baffle wall 31 close to the light-emitting module 10. The reflective part 414 will reflect the light back into the light-emitting module 10, and then the light will be reflected again by the metal and other reflecting layers in the light-emitting module 10. At least part of the light may be emitted into the light-transmitting portions 32. This is beneficial in increasing the amount of light emitted into the light-transmitting portions 32, thereby improving the transmittance of light, the display brightness, and the display effect.

Figure 16:
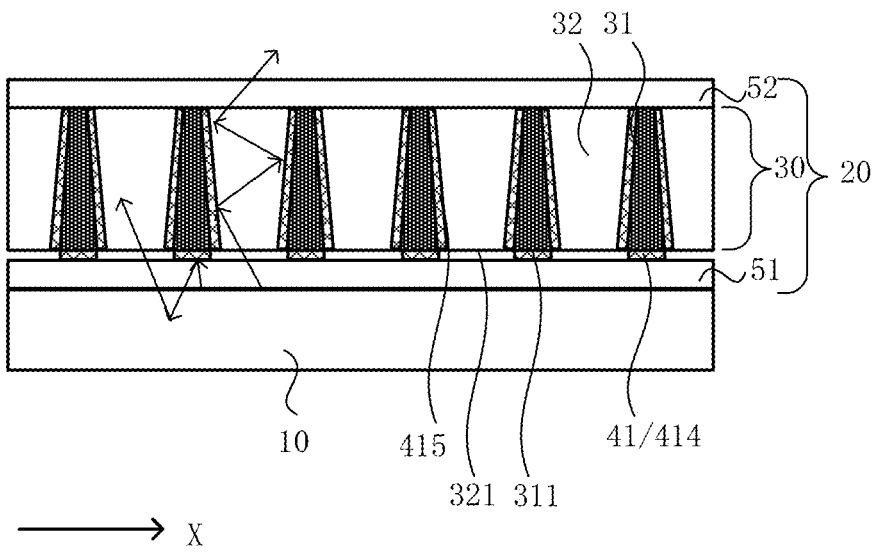
FIG. 16 is another cross-sectional view of the display module along the line AA' shown in FIG. 1.

FIG. 16 is another cross-sectional view of the display module along the AA' line shown in FIG. 1. Referring to FIGS. 1 and 16, in some embodiments, a reflective layer 415 is disposed on at least a portion of the sidewalls of the baffle walls 31.

Specifically, a reflective layer 415 is provided on at least part of the sidewalls of the baffle walls 31, so that the light originally directed toward the sidewall of the baffle walls 31 will be directed toward the reflective layer 415, and the light will be reflected on the reflective layer 415, thereby reducing the absorption of light by the baffle walls 31. This is beneficial to improving the light utilization rate, improving the display brightness, and improving the display effect.

It should be noted that FIG. 16 exemplarily shows that all the sidewalls of the baffle walls 31 are provided with a reflective layer 415. In some embodiments of the present disclosure, merely part of the sidewalls of the baffle walls 31 may be provided with a reflective layer 415, which will not be elaborated in the present disclosure.

Figure 17:
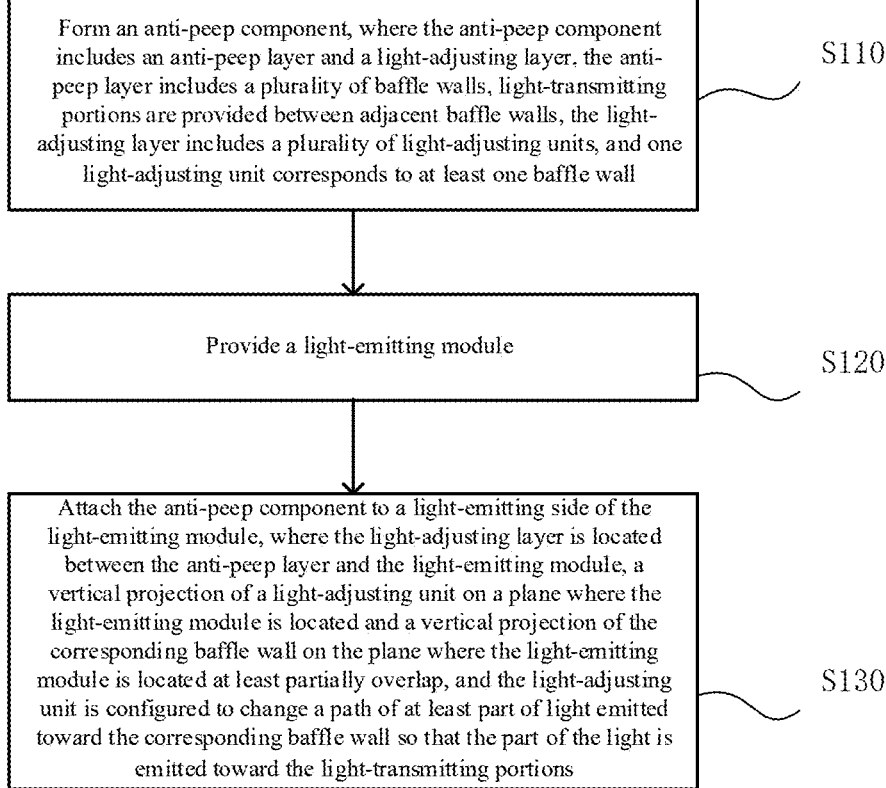
FIG. 17 is a flow chart of a method for making a display module, according to some embodiments of the present disclosure.

FIG. 17 is a flow chart of a method for making a display module, according to some embodiments of the present disclosure. Referring to FIG. 17, the present disclosure provides a method for making a display module, and the method includes the following steps.

Step S110: Form an anti-peep component, where the anti-peep component includes an anti-peep layer and a light-adjusting layer, the anti-peep layer includes a plurality of baffle walls, light-transmitting portions are provided between adjacent baffle walls, the light-adjusting layer includes a plurality of light-adjusting structures, and one light-adjusting structure corresponds to at least one baffle wall.

Step S120: Provide a light-emitting module.

Step S130: Attach the anti-peep component to a light-emitting side of the light-emitting module, where the light-adjusting layer is located between the anti-peep layer and the light-emitting module, a vertical projection of a light-adjusting structure on a plane where the light-emitting module is located and a vertical projection of the corresponding baffle wall on the plane where the light-emitting module is located at least partially overlap, and the light-adjusting structure is configured to change a path of at least part of light emitted toward the corresponding baffle wall so that the part of the light is emitted toward the light-transmitting portions.

Specifically, referring to FIGS. 1, 2, and 17, the display module made by the production method provided by the embodiments of the present disclosure includes a light-emitting module 10 and an anti-peep component 20, where the anti-peep component 20 is disposed on the light-emitting side of the light-emitting module 10. Optionally, when the display module is a liquid crystal display module, the light-emitting module 10 is a backlight source, and the display module also includes a liquid crystal display panel, and the liquid crystal display panel is located on the light-emitting side of the backlight source. In a direction perpendicular to the plane where the backlight source is located, the anti-peep component 20 may be disposed on both sides of the liquid crystal display panel. For example, the anti-peep component 20 may be disposed between the backlight source and the liquid crystal display panel, or on the side of the liquid crystal display panel away from the backlight source. Optionally, when the display module is an organic light-emitting display module or a micro-luminescent display module, the light-emitting module 10 is an organic light-emitting display panel, and the anti-peep component 20 is disposed on the light-emitting side of the organic light-emitting display panel.

It should be noted that in some embodiments of the present disclosure, the light-emitting module 10 may also be other light-emitting devices, and the anti-peep component 20 may also be configured to be disposed on the light-emitting side of other light-emitting devices, which will not be described in detail in the present disclosure.

The anti-peep component 20 includes an anti-peep layer 30, and the anti-peep layer 30 includes a plurality of baffle walls 31, and light-transmitting portions 32 are provided between adjacent baffle walls 31. The material of a light-transmitting portion 32 is a transparent material. A baffle wall 31 is a black light-absorbing structure, and the light incident on the baffle wall 31 may be absorbed. Optionally, the baffle wall 31 may be a graphic adhesive layer mixed with a black additive. The black additive may be carbon powder or other black material powder. The light incident on the anti-peep layer 30 is propagated based on the light-transmitting portions 32 between adjacent baffle walls 31, thereby limiting the transmission directions and transmission angles of the light emitted through the anti-peep layer 30, so that the display module has an anti-peep function.

Part of the light directed toward the anti-peep component 20 is directly directed toward the light-transmitting portions 32, and part of the light is directed toward the surfaces 311 of the baffle walls 31 close to the light-emitting module 10. The anti-peep component 20 further includes a light-adjusting layer 40, which is located between the anti-peep layer 30 and the light-emitting module 10. That is, the light emitted by the light-emitting module 10 is directed toward the anti-peep layer 30 through the light-adjusting layer 40. The light-adjusting layer 40 includes a plurality of light-adjusting structures 41, where one light-adjusting structure 41 corresponds to at least one baffle wall 31. The vertical projection of a light-adjusting structure 41 on the plane where the light-emitting module 10 is located and the vertical projection of the corresponding baffle wall 31 on the plane where the light-emitting module 10 is located at least partially overlap. The light-adjusting structure 41 is configured to change the path of at least part of the light emitted toward the corresponding baffle wall 31 so that the part of the light is emitted toward the light-transmitting portions 32. That is, through the setting of the light-adjusting structures 41, the path of part of the light originally emitted toward the surfaces 311 of the baffle walls 31 close to the light-emitting module 10 is changed, so that the part of the light is emitted toward the light-transmitting portions 32. This is beneficial in increasing the amount of light emitted into the light-transmitting portions 32, thereby improving the transmittance of light, the display brightness, and the display effect.

Figure 18:
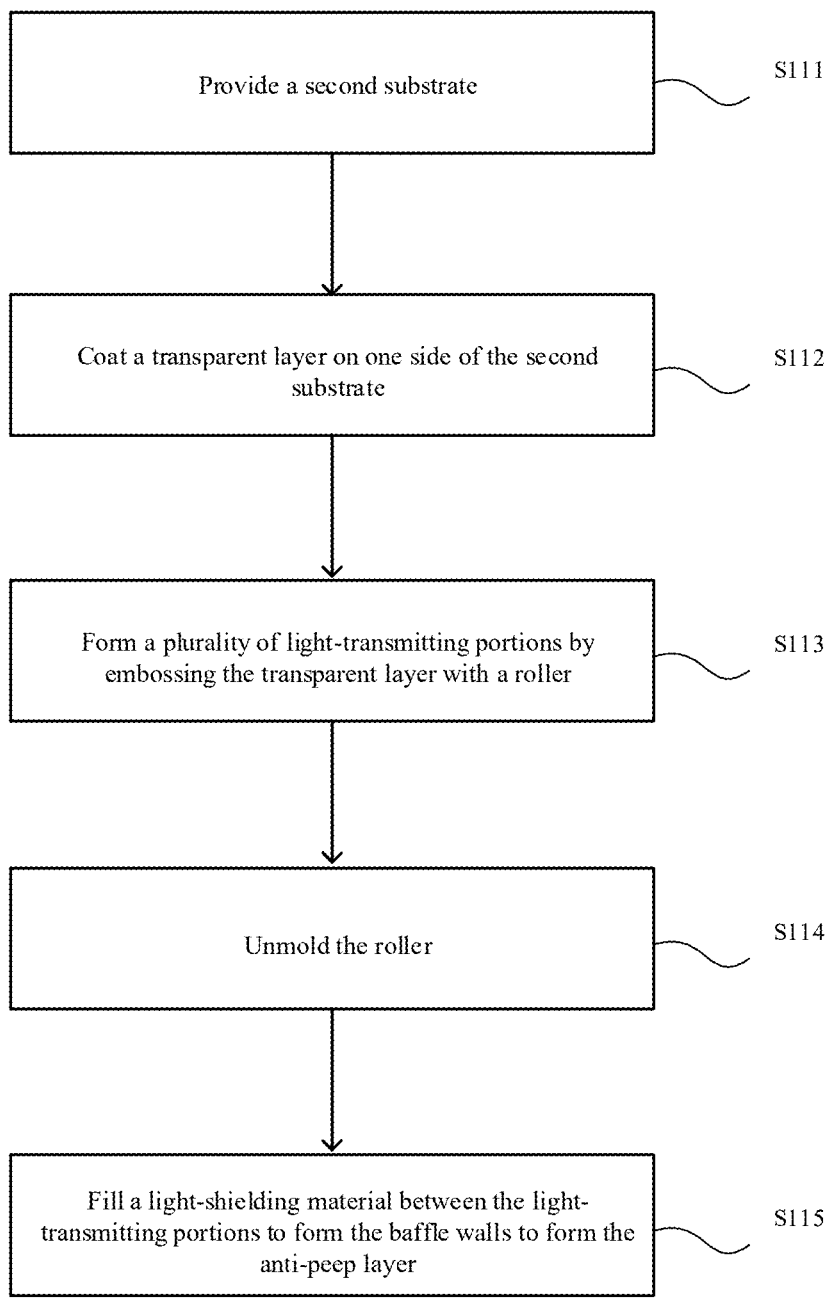
FIG. 18 is a flow chart of a method for making an anti-peep component, according to some embodiments of the present disclosure.

FIG. 18 is a flow chart of manufacturing an anti-peep component, according to some embodiments of the present disclosure. Referring to FIG. 18, in some embodiments, forming the anti-peep component in step S110 includes the following steps.

Step S111: Provide a second substrate.

Step S112: Coat a transparent layer on one side of the second substrate.

Step S113: Form a plurality of light-transmitting portions by embossing the transparent layer with a roller.

Step S114: Unmold the roller.

Step S115: Fill a light-shielding material between the light-transmitting portions to form the baffle walls, so as to form the anti-peep layer.

Figure 19:
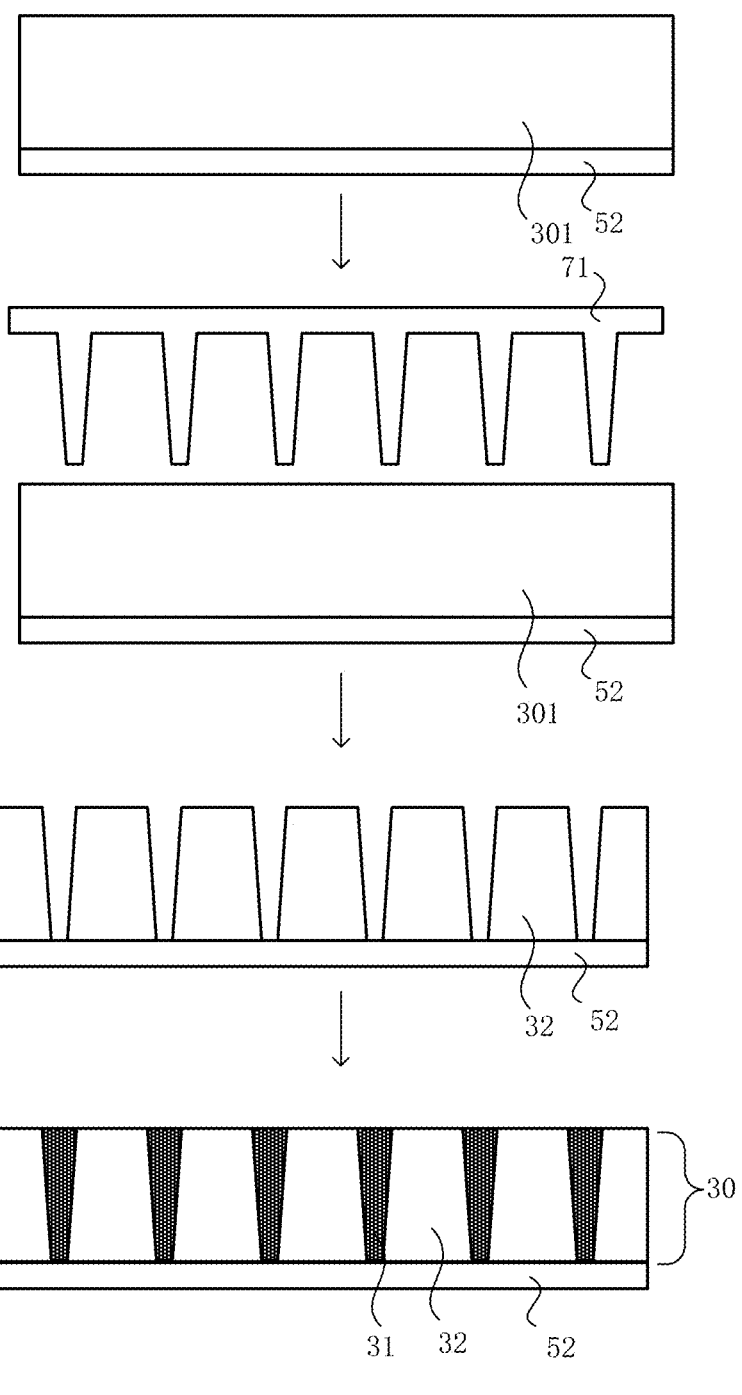
FIG. 19 is a flow diagram of a process for making an anti-peep component, according to some embodiments of the present disclosure.

Specifically, FIG. 19 is a flow diagram of a process for making an anti-peep component, according to some embodiments of the present disclosure. Referring to FIGS. 17-19, a transparent layer 301 may be first coated on one side of the second substrate 52, and then the transparent layer 301 may be embossed by a roller 71 to form a plurality of light-transmitting portions 32, thereby forming light-transmitting portions 32 on the second substrate 52. After the light-transmitting portions 32 are formed on the second substrate 52, the roller 71 is unmolded, and a light-shielding material is filled between the light-transmitting portions 32 to form baffle walls 31, thereby realizing the formation of the anti-peep layer 30 on the second substrate 52.

In some embodiments, forming the anti-peep component further includes forming a light-adjusting layer, in which a light-adjusting structure includes a first light-adjusting structure, a surface located on at least one side of the first light-adjusting structure includes a first curved surface portion, the first curved surface portion is concave toward the interior of the light-adjusting layer, and the first curved surface portion forms a concave lens, or the light-adjusting structure includes a second light-adjusting structure, a surface located on at least one side of the second light-adjusting structure includes a second curved surface portion, the second curved surface portion is convex toward a direction away from the interior of the light-adjusting layer, and the second curved surface portion forms a convex lens.

Specifically, referring to FIGS. 1 and 2, in the display module made by the production methods provided by the embodiments of the present disclosure, in the light-adjusting layer 40, a light-adjusting structure 41 includes a first light-adjusting structure 411, and along the direction perpendicular to the plane where the light-emitting module 10 is located, the surface located at least on one side of the first light-adjusting structure 411 includes a first curved surface portion 4111, and the first curved surface portion 4111 is concave toward the interior of the light-adjusting layer 40, and the first curved surface portion 4111 forms a concave lens, which has a divergent effect on light. The vertical projection of the surface of the side of a baffle wall 31 close to the light-emitting module 10 on the plane where the light-emitting module 10 is located and the vertical projection of the corresponding first curved surface portion 4111 on the plane where the light-emitting module 10 is located at least partially overlap. The light originally directed toward the surface 311 of the side of the baffle wall 31 close to the light-emitting module 10 is thus diverged by the first curved surface portion 4111, and part of the light will change the path and be directed toward the light-transmitting portions 32. This is conducive to increasing the number of light rays entering the light-transmitting portions 32, thereby facilitating the light transmittance, display brightness, and display effect.

Optionally, when the material of the light-adjusting layer 40 is an organic material, the first curved surface portions 4111 may be formed on a surface located on at least one side of the first light-adjusting structures 411 in a direction perpendicular to the plane where the light-emitting module 10 is located by embossing with a roller. When the material of the light-adjusting layer 40 is glass or metal oxide, the first curved surface portions 4111 may be formed on a surface located on at least one side of the first light-adjusting structures 411 in a direction perpendicular to the plane where the light-emitting module 10 is located by etching. Apparently, in other disclosed embodiments, the first curved surface portions 4111 may also be formed on a surface located on at least one side of the first light-adjusting structures 411 in a direction perpendicular to the plane where the light-emitting module 10 is located through other different means, which will not be described in detail in the present disclosure.

Referring to FIG. 6, in the display module made by the production method provided by the embodiments of the present disclosure, in the light-adjusting layer 40, the light-adjusting structure 41 includes a second light-adjusting structure 412. Along the direction perpendicular to the plane where the light-emitting module 10 is located, the surface on at least one side of the second light-adjusting structure 412 includes a second curved surface portion 4121, and the second curved surface portion 4121 is convex in a direction away from the interior of the light-adjusting layer 40, and the second curved surface portion 4121 forms a convex lens, which has the effect of converging light. The vertical projection of the second curved surface portion 4121 on the plane where the light-emitting module 10 is located and the vertical projection of the corresponding light-transmitting portion 32 on the plane where the light-emitting module 10 is located at least partially overlap. The vertical projection of the second curved surface portion 4121 on the plane where the light-emitting module 10 is located and the vertical projection of the surface(s) 311 of the side of the corresponding baffle wall(s) 31 close to the light-emitting module 10 on the plane where the light-emitting module 10 is located at least partially overlap. That is, the second curved surface portion 4121 may converge the light incident on the light-entering side of the anti-peep layer 30 toward the normal direction close to the second curved surface portion 4121, and the normal of the second curved surface portion 4121 extends through an area corresponding to the light-transmitting portion 32. The second curved surface portion 4121 may thus change the path of part of the light originally directed toward the surface(s) 311 of the side of the baffle wall(s) 31 close to the light-emitting module 10, so that part of the light is directed toward the light-transmitting portions 32. This is beneficial in increasing the amount of light entering the light-transmitting portions 32, thereby facilitating the improvement of the light transmittance, the display brightness, and the display effect.

Optionally, when the material of the light-adjusting layer 40 is an organic material, second curved surface portions 4121 may be formed on a surface located on at least one side of the second light-adjusting structures 412 in a direction perpendicular to the plane where the light-emitting module 10 is located by embossing with a roller. When the material of the light-adjusting layer 40 is glass or metal oxide, second curved surface portions 4121 may be formed on a surface located on at least one side of the second light-adjusting structures 412 in a direction perpendicular to the plane where the light-emitting module 10 is located by etching. Apparently, in some embodiments, the second curved surface portions 4121 may also be formed on a surface located on at least one side of the second light-adjusting structures 412 in a direction perpendicular to the plane where the light-emitting module 10 is located through other different means, which will not be described in detail in the present disclosure.

Figure 20:
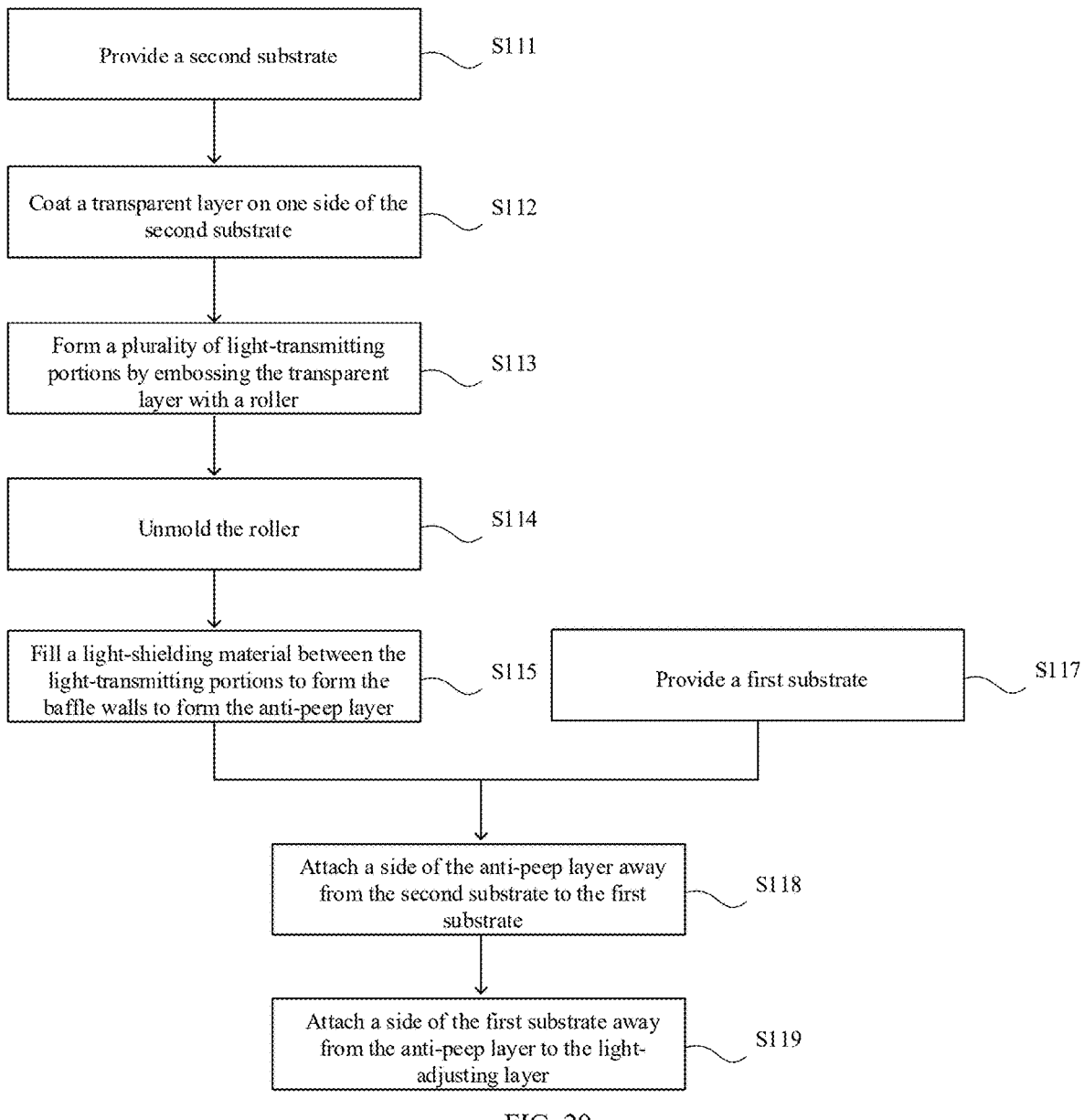
FIG. 20 is a flow chart of another method for making an anti-peep component, according to some embodiments of the present disclosure.

FIG. 20 is a flow chart of another method for making an anti-peep component, according to some embodiments of the present disclosure. Referring to FIG. 20, in some embodiments, forming the anti-peep component in step S110 further includes the following steps.

Step S117: Provide a first substrate.

Step S118: Attach a side of the anti-peep layer away from the second substrate to the first substrate.

Step S119: Attach a side of the first substrate away from the anti-peep layer to the light-adjusting layer.

Specifically, referring to FIG. 2 or FIG. 6, and FIGS. 19 and 20, after the anti-peep layer 30 is formed on the second substrate 52, the side of the anti-peep layer 30 away from the second substrate 52 is attached to the first substrate 51. The side of the first substrate 51 away from the anti-peep layer 30 is then attached to the light-adjusting layer 40, so as to realize the production of the anti-peep component 20. In the anti-peep component 20, along the direction perpendicular to the plane where the light-emitting module 10 is located, the first substrate 51 and the second substrate 52 are respectively located on both sides of the anti-peep layer 30, and the second substrate 52 is located on the side of the anti-peep layer 30 away from the light-emitting module 10. The first substrate 51 and the second substrate 52 may support and protect the anti-peep layer 30, ensure the structural stability of the anti-peep layer 30, and extend the service life. The first substrate 51 is located between the anti-peep layer 30 and the light-adjusting layer 40. That is, the light-adjusting layer 40 may be bonded to the side of the first substrate 51 away from the anti-peep layer 30, so that the light-adjusting layer 40 may be configured in the anti-peep component 20.

FIG. 21 is a flow chart of another method for making an anti-peep component, according to some embodiments of the present disclosure. Referring to FIG. 21, in some embodiments, forming the anti-peep component in step S110 further includes the following steps.

Step S1110: Provide a first substrate.

Step S1111: Attach a side of the anti-peep layer away from the second substrate to the light-adjusting layer.

Step S1112: Attach a side of the light-adjusting layer away from the anti-peep layer to the first substrate.

Specifically, referring to FIG. 9 or FIG. 10, and FIGS. 19 and 21, after the anti-peep layer 30 is formed on the second substrate 52, the side of the anti-peep layer 30 away from the second substrate 52 is directly bonded to the light-adjusting layer 40, and then the side of the light-adjusting layer 40 away from the anti-peep layer 30 is bonded to the first substrate 51, thereby realizing the production of the anti-peep component 20. In the anti-peep component 20, the first substrate 51 is located on the side of the light-adjusting layer 40 close to the light-emitting module 10, and the light-adjusting layer 40 may be bonded to the side of the anti-peep layer 30 away from the second substrate 52. Accordingly, the light-adjusting layer 40 may be configured in the anti-peep component 20, and the second substrate 52 is located on the side of the anti-peep layer 30 away from the light-emitting module 10. The first substrate 51 and the second substrate 52 may support and protect the anti-peep layer 30 and the light-adjusting layer 40, thereby ensuring the structural stability of the anti-peep layer 30 and the light-adjusting layer 40 and extending the service life.

Figure 22:
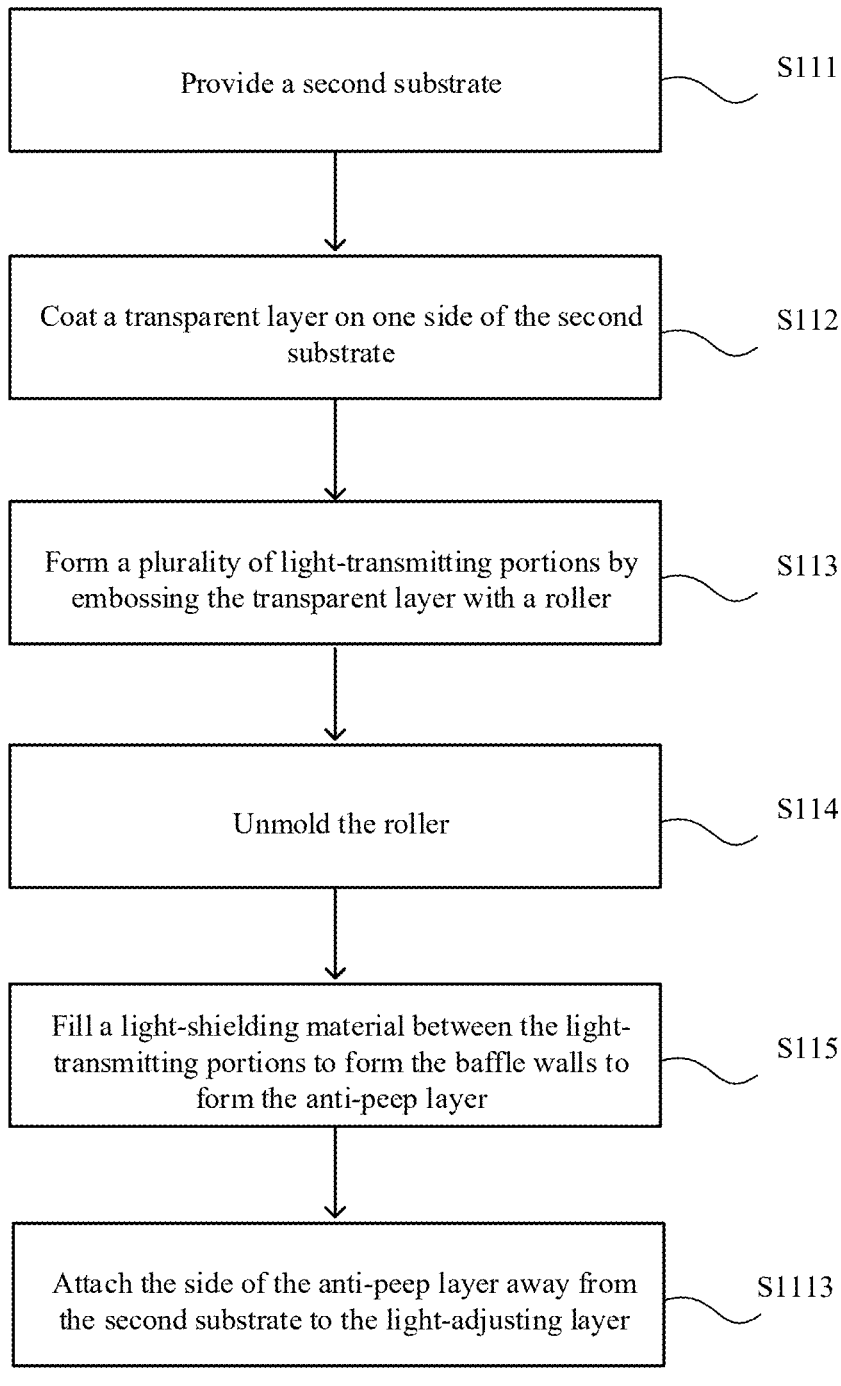
FIG. 22 is a flow chart of another method for making an anti-peep component, according to some embodiments of the present disclosure.

FIG. 22 is a flow chart of another method for making an anti-peep component, according to some embodiments of the present disclosure. Referring to FIG. 22, in some embodiments, forming the anti-peep component in step S110 further includes the following step.

Step S1113: Attach the side of the anti-peep layer away from the second substrate to the light-adjusting layer.

Specifically, referring to FIG. 11 or FIG. 12, and FIGS. 19 and 22, after the anti-peep layer 30 is formed on the second substrate 52, the side of the anti-peep layer 30 away from the second substrate 52 is directly bonded to the light-adjusting layer 40, thereby realizing the production of the anti-peep component 20. In the anti-peep component 20, the light-adjusting layer 40 and the second substrate 52 may support and protect the anti-peep layer 30, ensure the structural stability of the anti-peep layer 30, and extend the service life. Meanwhile, the light-adjusting layer 40 is multiplexed as the first substrate 51, which is conducive to reducing the thickness of the anti-peep component 20, thereby helping to reduce the thickness of the display module.

Figure 23:
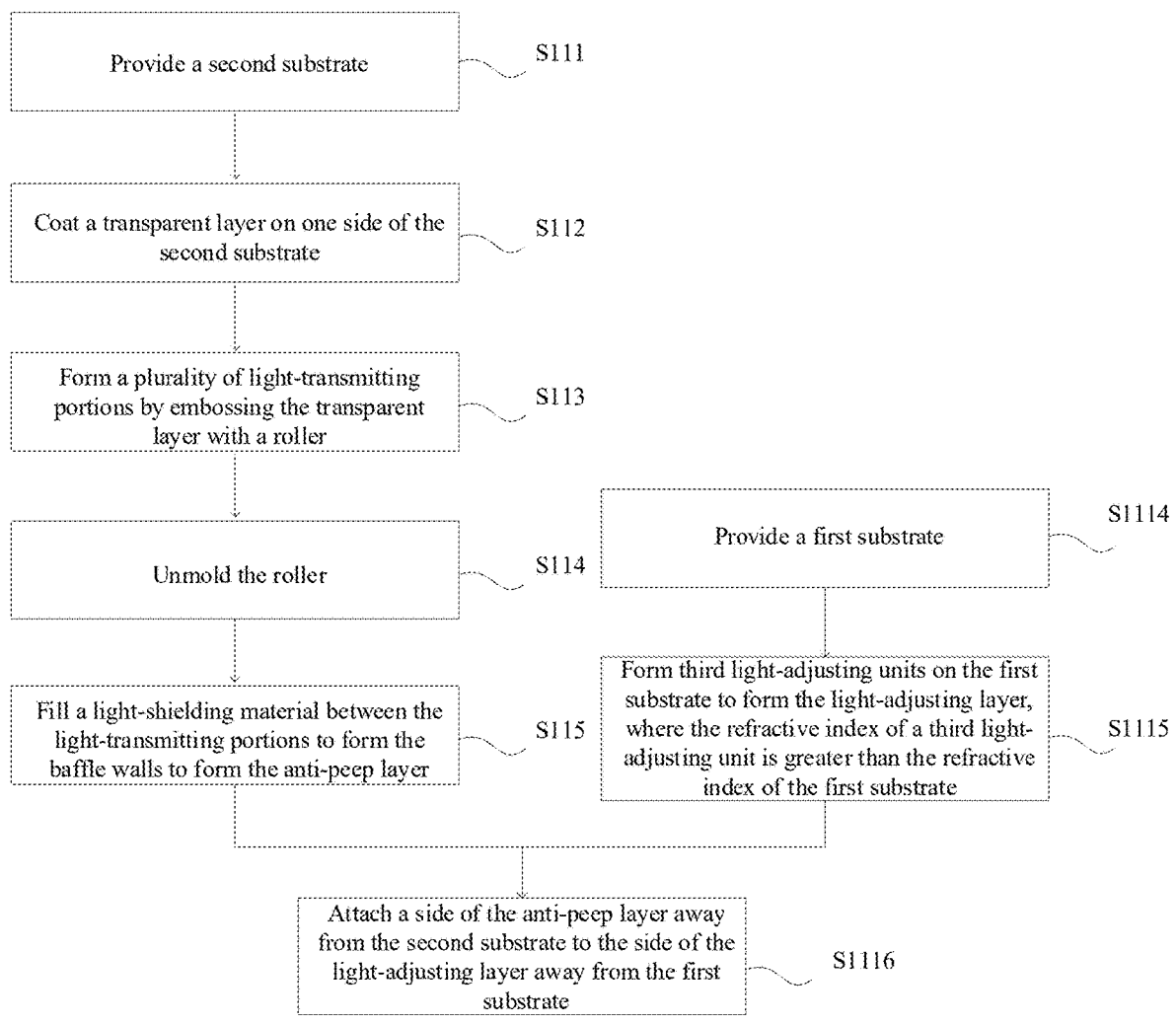
FIG. 23 is a flow chart of another method for making an anti-peep component, according to some embodiments of the present disclosure.

FIG. 23 is a flow chart of another method for making an anti-peep component, according to some embodiments of the present disclosure. Referring to FIG. 23, in some embodiments, forming the anti-peep component in step S110 further includes the following steps.

Step S1114: Provide a first substrate.

Step S1115: Form third light-adjusting structures on the first substrate to form a light-adjusting layer, where the refractive index of the third light-adjusting structures is greater than the refractive index of the first substrate.

Step S1116: Attach a side of the anti-peep layer away from the second substrate to the side of the light-adjusting layer away from the first substrate.

Figure 24:
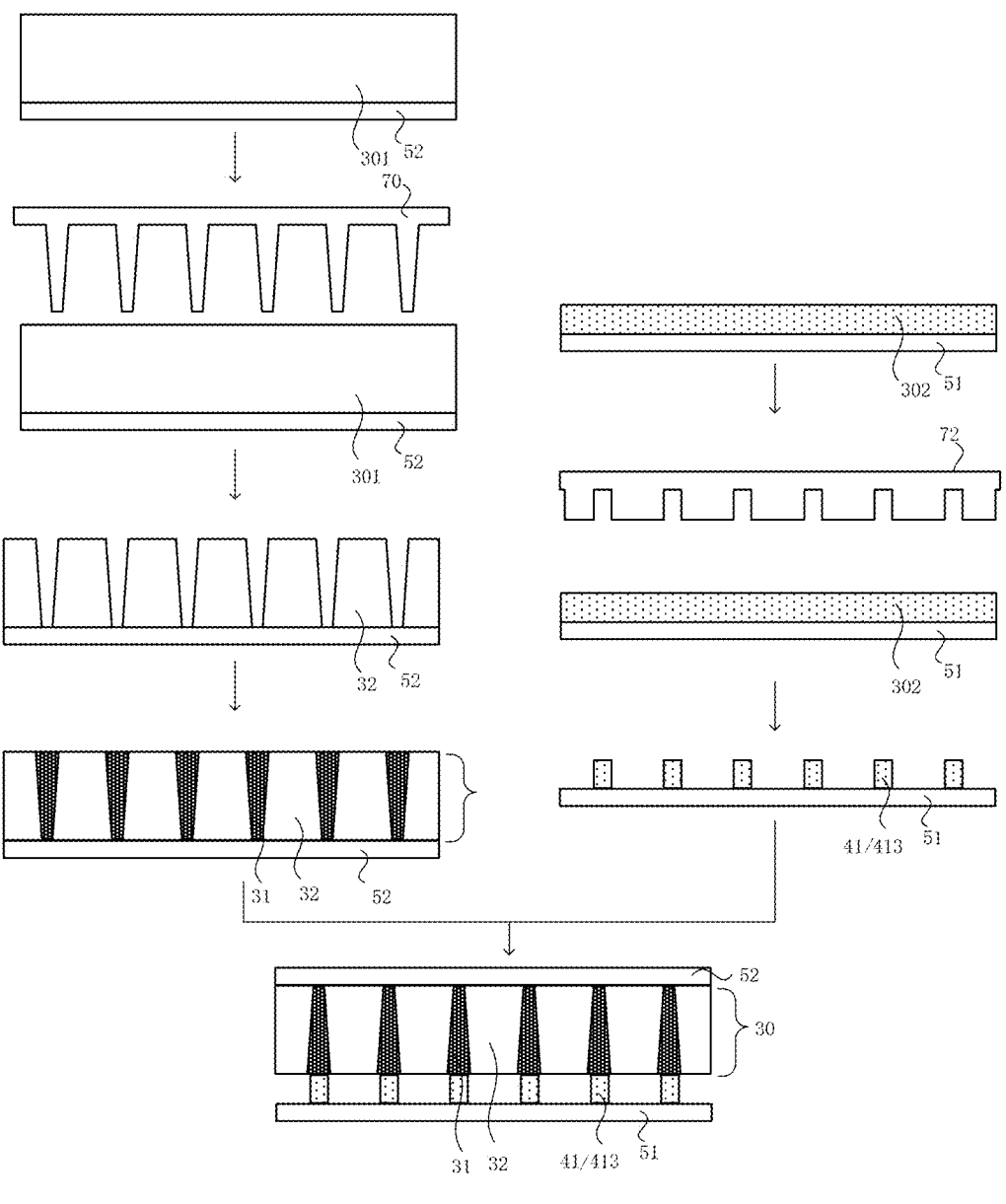
FIG. 24 is a flow diagram of another process for making an anti-peep component, according to some embodiments of the present disclosure.

Specifically, FIG. 24 is a flow diagram of another process for making an anti-peep component, according to some embodiments of the present disclosure. Referring to FIGS. 17, 23, and 24, third light-adjusting structures 413 may be first formed on one side of the first substrate 51 to form a light-adjusting layer 40, where the refractive index of the third light-adjusting structures 413 is greater than the refractive index of the first substrate 51. Optionally, an organic layer 302 may be first coated on one side of the first substrate 51, where the refractive index of the organic layer 302 is greater than the refractive index of the first substrate 51. Then the organic layer 302 is embossed by a roller 72 to form a plurality of third light-adjusting structures 413, thereby forming the third light-adjusting structures 413 on the first substrate 51. After the third light-adjusting structures 413 are formed on the first substrate 51, the roller 72 is unmolded. Apparently, in some embodiments of the present disclosure, the third light-adjusting structures 413 may also be made of other materials, and accordingly, the third light-adjusting structures 413 may also be formed on the first substrate 51 by other methods, which will not be described in detail in the present disclosure.

After the third light-adjusting structures 413 are formed on the first substrate 51, the side of the anti-peep layer 30 away from the second substrate 52 is attached to the side of the light-adjusting layer 40 away from the first substrate 51, thereby forming the anti-peep component 20. Therefore, in the display module made by the production method provided by the embodiments of the present disclosure, the anti-peep component 20 includes a first substrate 51, and the first substrate 51 is located on the side of the light-adjusting layer 40 close to the light-emitting module 10. A light-adjusting structure 41 includes a third light-adjusting structure 413, and at least part of the light originally emitted toward the surface 311 of the side of a baffle wall 31 close to the light-emitting module 10 is first emitted to the interface between the third light-adjusting structure 413 and the first substrate 51. Since the refractive index of the third light-adjusting structure 413 is less than the refractive index of the first substrate 51, part of the light originally emitted toward the surface 311 of the side of the baffle wall 31 close to the light-emitting module 10 is refracted and deflected toward a direction close to the light-transmitting portions 32. The light originally emitted toward the surface 311 of the side of the baffle wall 31 close to the light-emitting module 10 is thus emitted to the light-transmitting portions 32. This is beneficial in increasing the amount of light entering the light-transmitting portions 32, thereby facilitating the improvement of the light transmittance, the display brightness, and the display effect.

Figure 25:
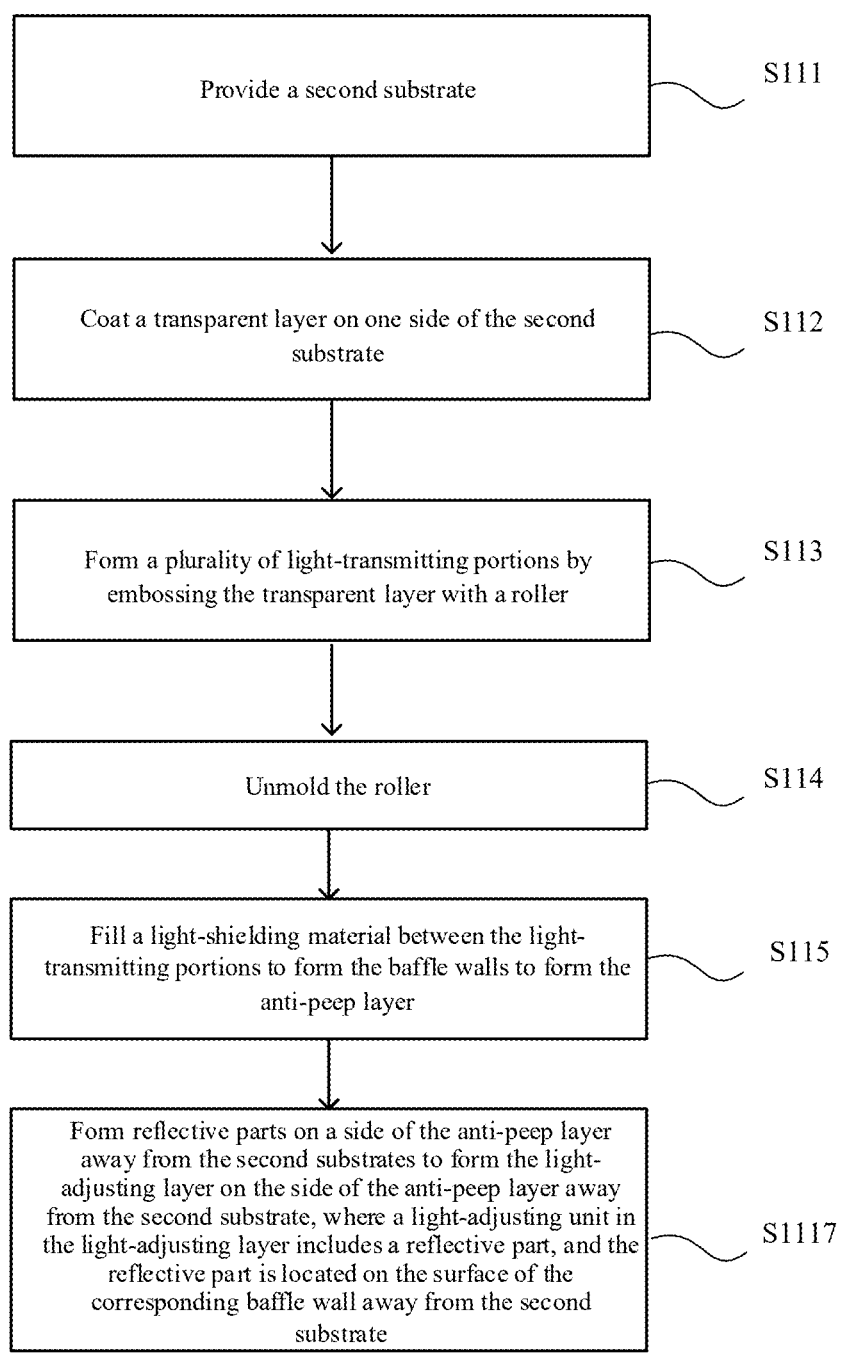
FIG. 25 is a flow chart of another method for making an anti-peep component, according to some embodiments of the present disclosure.

FIG. 25 is a flow chart of another method for making an anti-peep component, according to some embodiments of the present disclosure. Referring to FIG. 25, in some embodiments, forming the anti-peep component in step S110 further includes the following step.

Step S1117: Form reflective parts on the side of the anti-peep layer away from the second substrate, so as to form the light-adjusting layer on the side of the anti-peep layer away from the second substrate, where a light-adjusting structure in the light-adjusting layer includes a reflective part, and the reflective part is located on the surface of the corresponding baffle wall away from the second substrate.

Figure 26:
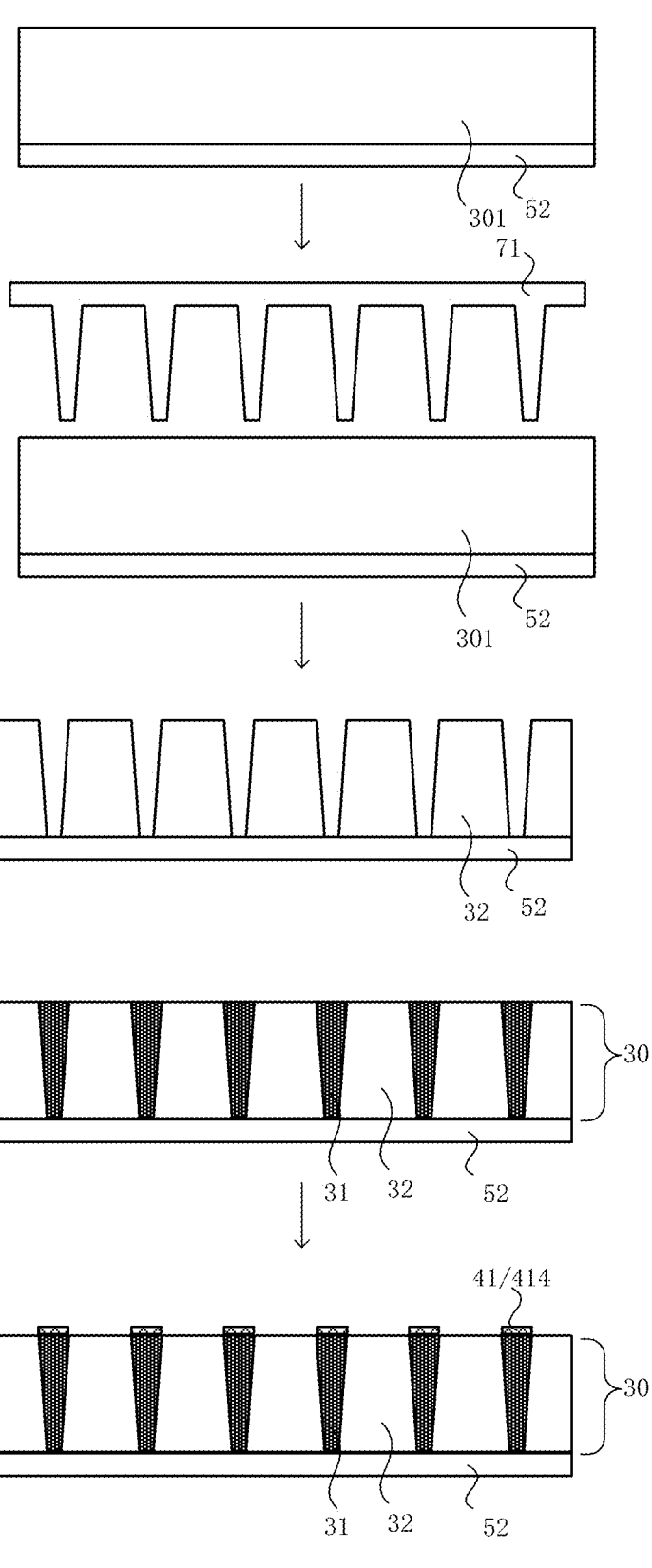
FIG. 26 is a flow diagram of another process for making an anti-peep component, according to some embodiments of the present disclosure.

Specifically, FIG. 26 is a flow diagram of another process for making an anti-peep component, according to some embodiments of the present disclosure. Referring to FIGS. 15, 17, 25, and 26, after the anti-peep layer 30 is formed on the second substrate 52, reflective parts 414 are formed on the side of the anti-peep layer 30 away from the second substrate 52, so as to form the light-adjusting layer 40 on the side of the anti-peep layer 30 away from the second substrate 52. In the light-adjusting layer 40, a light-adjusting structure 41 includes a reflective part 414, and the reflective part 414 is located on the surface of the corresponding baffle wall 31 away from the second substrate 52. Then, the first substrate 51 is bonded to the side of the light-adjusting layer 40 away from the second substrate 52, thereby realizing the production of the anti-peep component 20.

Optionally, the material of the reflective parts 414 may be metal or metal oxide.

Optionally, a mask plate may be placed on the side of the anti-peep layer away from the second substrate, and then the reflective parts 414 may be formed on the surface of the baffle walls 31 away from the second substrate 52 by sputtering or coating. Apparently, a mask plate may also be placed on one side of the first substrate 51, and then the reflective parts 414 may be provided on the first substrate 51 by sputtering or coating, and then the reflective parts 414 may be bonded to the side of the anti-peep layer 30 away from the second substrate 52, so that the reflective parts 414 are disposed on the surface of the corresponding baffle walls 31 away from the second substrate 52. At this time, the alignment precision is required to be high, and the accuracy should be less than or equal to 2 μm.

In the display module made by the production method provided by the embodiments of the present disclosure, a light-adjusting structure 41 includes a reflective part 414, and the reflective part 414 is provided on the surface 311 of the baffle wall 31 close to the light-emitting module 10. The light originally emitted toward the surface 311 of the baffle wall 31 close to the light-emitting module 10 will first be emitted to the reflective part 414 on the surface 311 of the baffle wall 31 close to the light-emitting module 10. The reflective part 414 will reflect the light back into the light-emitting module 10, and then the light will be reflected again by the reflective layer such as metal in the light-emitting module 10. At least part of the light may be emitted into the light-transmitting portions 32. This is beneficial in increasing the amount of light emitted into the light-transmitting portions 32, thereby improving the transmittance of light, the display brightness, and the display effect.

Figure 27:
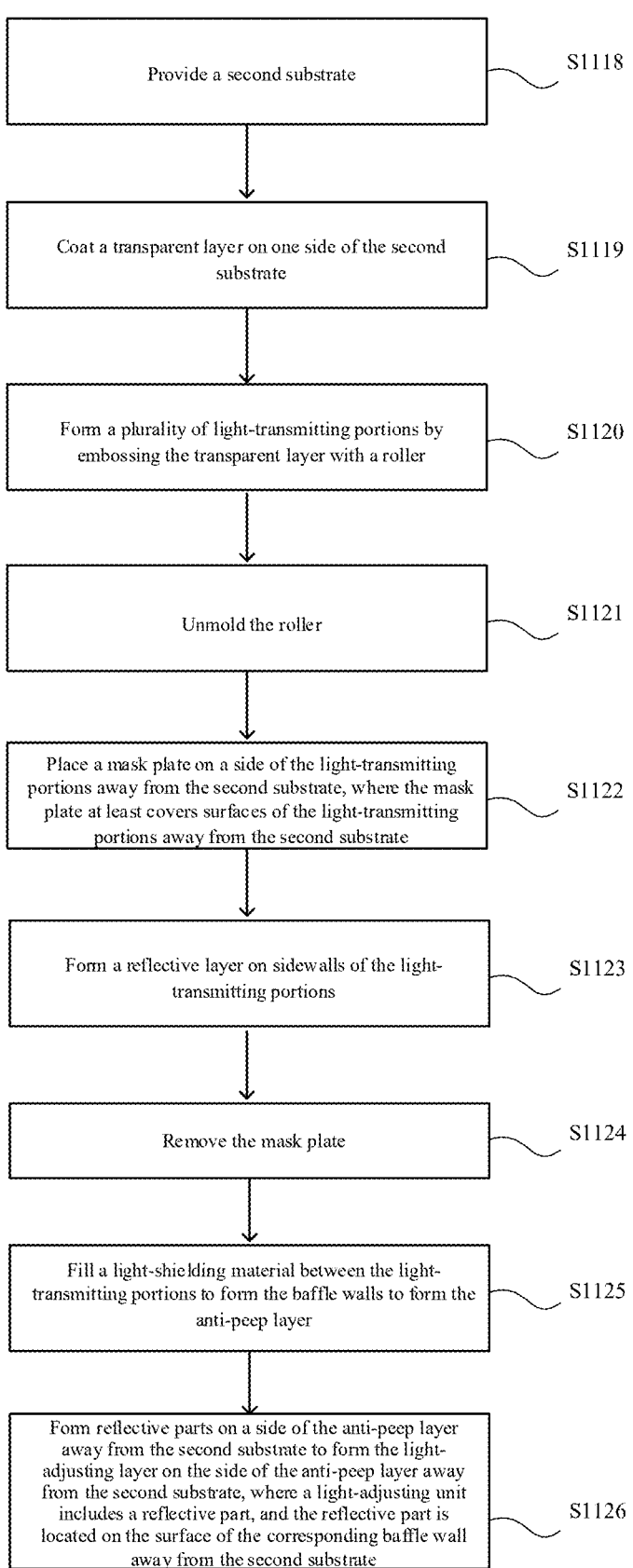
FIG. 27 is a flow chart of another method for making an anti-peep component, according to some embodiments of the present disclosure.

FIG. 27 is a flow chart of another method for making an anti-peep component, according to some embodiments of the present disclosure. Referring to FIG. 27, in some embodiments, forming the anti-peep component in step S110 includes the following steps.

Step S1118: Provide a second substrate.

Step S1119: Coat a transparent layer on one side of the second substrate.

Step S1120: Form a plurality of light-transmitting portions by embossing the transparent layer with a roller.

Step S1121: Unmold the roller.

Step S1122: Place a mask plate on the side of the light-transmitting portions away from the second substrate, where the mask plate at least covers the surfaces of the light-transmitting portions away from the second substrate.

Step S1123: Form a reflective layer on the sidewalls of the light-transmitting portions.

Step S1124: Remove the mask plate.

Step S1125: Fill a light-shielding material between the light-transmitting portions to form the baffle walls, so as to form the anti-peep layer.

Step S1126: Form reflective parts on the side of the anti-peep layer away from the second substrate, so as to form the light-adjusting layer on the side of the anti-peep layer away from the second substrate, where a light-adjusting structure includes a reflective part, and the reflective part is located on the surface of the corresponding baffle wall away from the second substrate.

Figure 28:
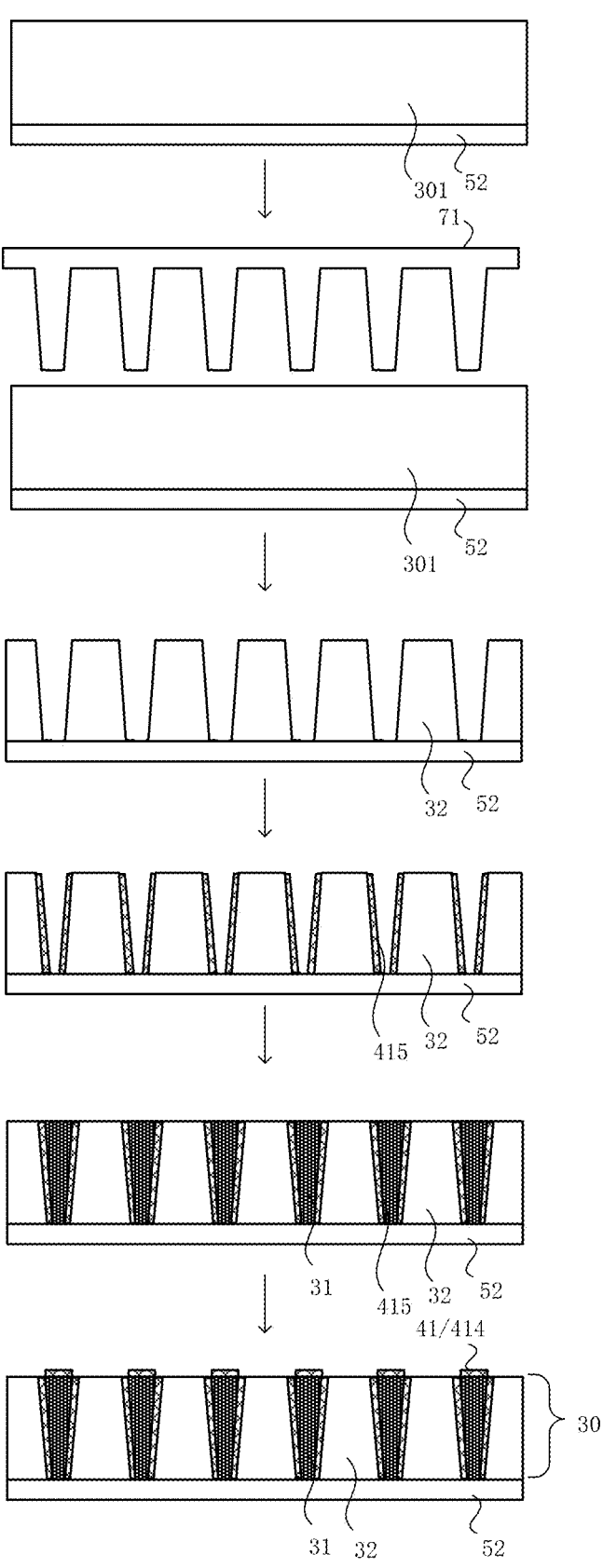
FIG. 28 is a flow diagram of another process for making an anti-peep component, according to some embodiments of the present disclosure.

Specifically, FIG. 28 is a flow diagram of another process for making an anti-peep component, according to some embodiments of the present disclosure. Referring to FIGS. 16, 17, 27, and 28, a transparent layer 301 may be first coated on one side of the second substrate 52, and then the transparent layer 301 may be embossed by a roller 71 to form a plurality of light-transmitting portions 32, thereby forming light-transmitting portions 32 on the second substrate 52. After the light-transmitting portions 32 are formed on the second substrate 52, the roller 71 is unmolded, and then a mask plate is placed on the side of the light-transmitting portions 32 away from the second substrate 52, where the mask plate at least covers the surfaces of the light-transmitting portions 32 away from the second substrate 52. A reflective layer 415 is then formed on the sidewalls of the light-transmitting portions 32, and no reflective layer is formed on the side of the light-transmitting portions 32 away from the second substrate 52. After the reflective layer 415 is formed on the sidewalls of the light-transmitting portions 32, the mask plate is removed, and a light-shielding material is filled between the light-transmitting portions 32 to form baffle walls 31, thereby realizing the formation of an anti-peep layer 30 on the second substrate 52. After the anti-peep layer 30 is formed on the second substrate 52, reflective parts 414 are formed on the side of the anti-peep layer 30 away from the second substrate 52, so as to form the light-adjusting layer 40 on the side of the anti-peep layer 30 away from the second substrate 52. In the light-adjusting layer 40, a light-adjusting structure 41 includes a reflective part 414, and the reflective part 414 is located on the surface of the corresponding baffle wall 31 away from the second substrate 52. Then, the first substrate 51 is bonded to the side of the light-adjusting layer 40 away from the second substrate 52, thereby realizing the production of the anti-peep component 20.

Optionally, a mask plate may be placed on the side of the anti-peep layer away from the second substrate, and then the reflective parts 414 may be formed on the surface of the baffle walls 31 away from the second substrate 52 by sputtering or coating. Apparently, a mask plate may also be placed on one side of the first substrate 51, and then the reflective part 414 may be formed on the first substrate 51 by sputtering or coating, and then the reflective parts 414 may be bonded to the side of the anti-peep layer 30 away from the second substrate 52, so that the reflective parts 414 are located on the surfaces of the corresponding baffle walls 31 away from the second substrate 52. At this time, the alignment precision is required to be high, and the accuracy should be less than or equal to 2 μm.

In the display module made by the production method provided by the embodiments of the present disclosure, a light-adjusting structure 41 includes a reflective part 414, and the reflective part 414 is provided on the surface 311 of the baffle wall 31 close to the light-emitting module 10. The light originally emitted toward the surface 311 of the baffle wall 31 close to the light-emitting module 10 will first be emitted to the reflective part 414 on the surface 311 of the baffle wall 31 close to the light-emitting module 10. The reflective part 414 will reflect the light back into the light-emitting module 10, and then the light will be reflected again by the reflective layer such as metal in the light-emitting module 10. At least part of the light may be emitted into the light-transmitting portions 32. This is beneficial in increasing the amount of light emitted into the light-transmitting portions 32, thereby improving the transmittance of light, the display brightness, and the display effect. Meanwhile, a reflective layer 415 is provided on at least part of the sidewalls of the baffle wall 31. Accordingly, the light originally directed toward the sidewalls of the baffle wall 31 will be directed toward the reflective layer 415, and the light will be reflected on the reflective layer 415, thereby reducing the absorption of light by the baffle wall 31. This is beneficial to improving the light utilization rate, improving the display brightness, and improving the display effect.

Figure 29:
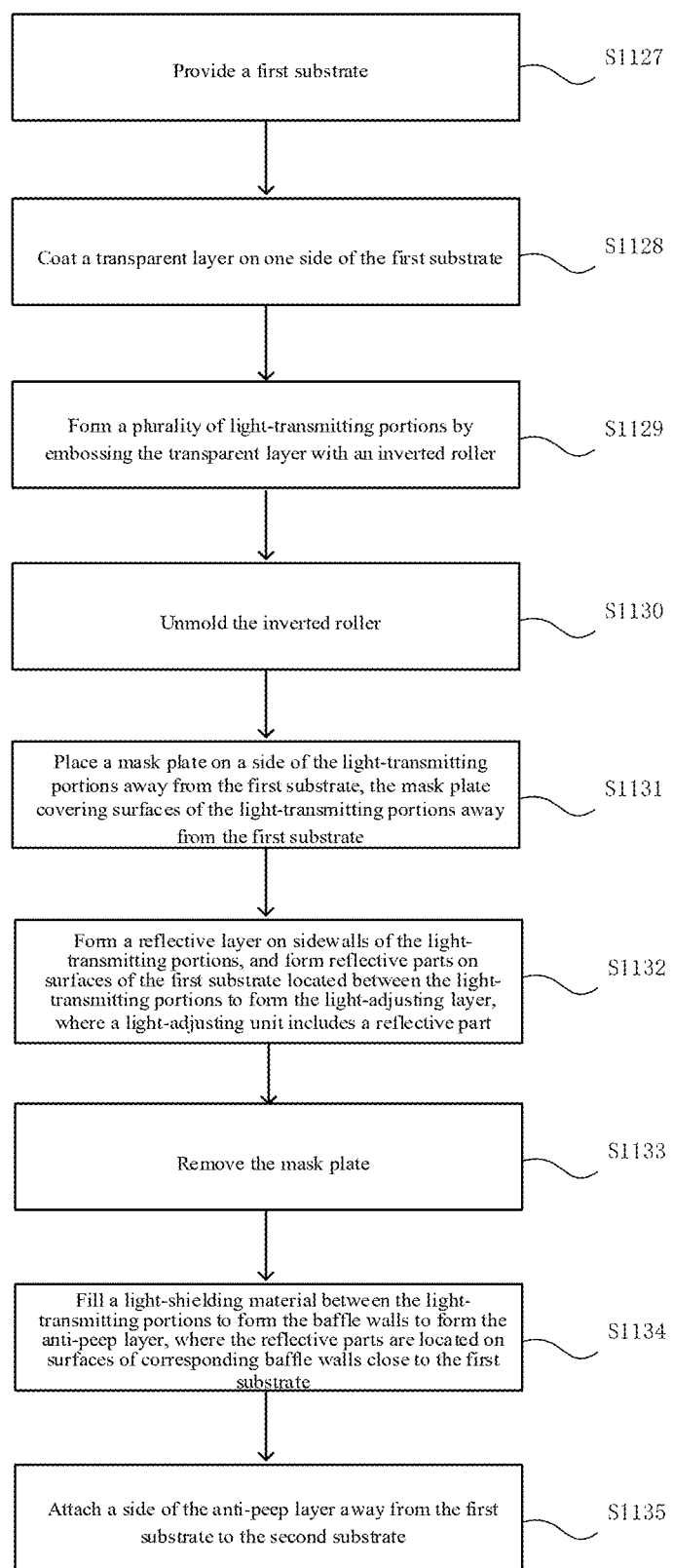
FIG. 29 is a flow chart of another method for making an anti-peep component, according to some embodiments of the present disclosure.

FIG. 29 is a flow chart of another method for making an anti-peep component, according to some embodiments of the present disclosure. Referring to FIG. 29, in some embodiments, forming the anti-peep component in step S110 includes the following steps.

Step S1127: Provide a first substrate.

Step S1128: Coat a transparent layer on one side of the first substrate.

Step S1129: Form a plurality of light-transmitting portions by embossing the transparent layer with an inverted roller.

Step S1130: Unmold the inverted roller.

Step S1131: Place a mask plate on a side of the light-transmitting portions away from the first substrate, the mask plate covering the surfaces of the light-transmitting portions away from the first substrate.

Step S1132: Form a reflective layer on the sidewalls of the light-transmitting portions, and form reflective parts on the surface of the first substrate located between the light-transmitting portions, so as to form a light-adjusting layer, in which a light-adjusting structure includes a reflective part.

Step S1133: Remove the mask plate.

Step S1134: Fill a light-shielding material between light-transmitting portions to form the baffle walls, so as to form the anti-peep layer, and the reflective parts are located on the surfaces of the corresponding baffle walls close to the first substrate.

Step S1135: Attach a side of the anti-peep layer away from the first substrate to the second substrate.

Figure 30:
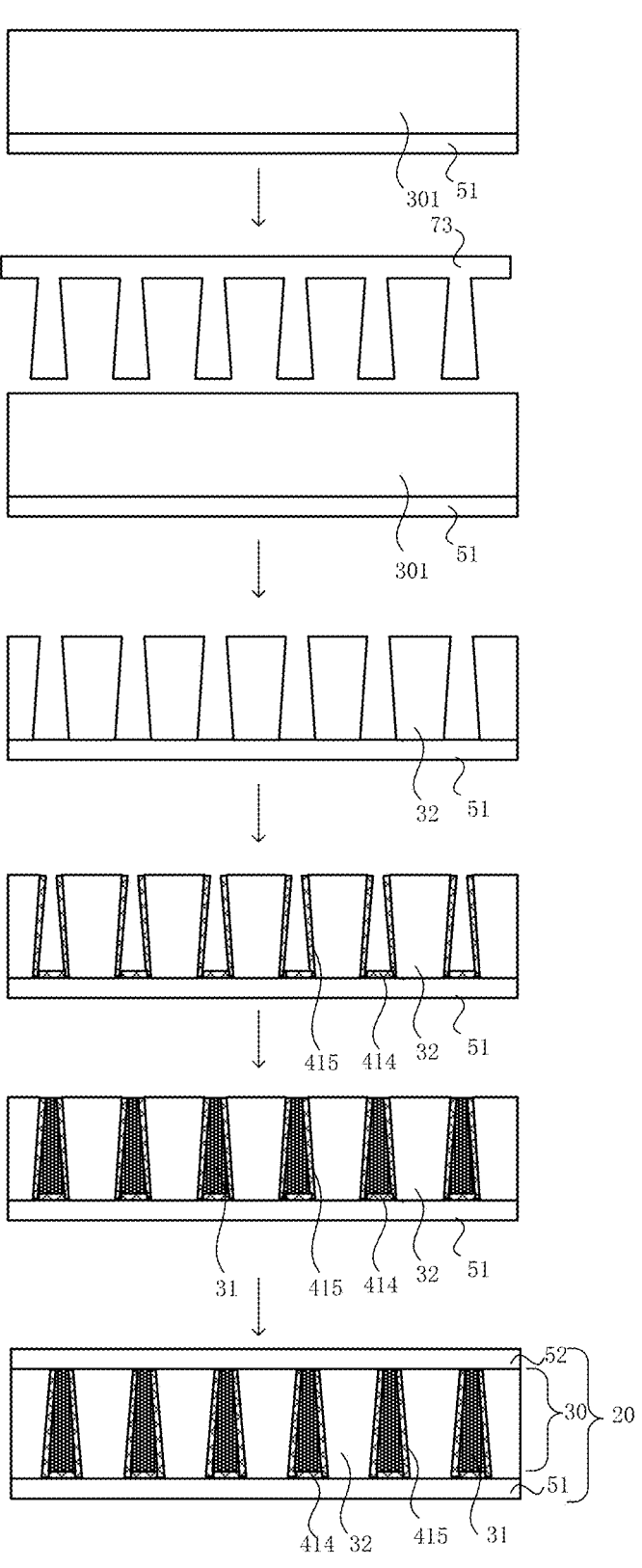
FIG. 30 is a flow diagram of another process for making an anti-peep component, according to some embodiments of the present disclosure.

Specifically, FIG. 30 is a flow diagram of another process for making an anti-peep component, according to some embodiments of the present disclosure. Referring to FIGS. 17, 29, and 30, a transparent layer 301 may be first coated on one side of the first substrate 51, and then the transparent layer 301 is embossed with an inverted roller 73 to form a plurality of light-transmitting portions 32, thereby forming the light-transmitting portions 32 on the first substrate 51. After the light-transmitting portions 32 are formed on the first substrate 51, the inverted roller 73 is unmolded from the side, and then a mask plate is placed on the side of the light-transmitting portions 32 away from the first substrate 51, the mask plate covers the surface of the light-transmitting portions 32 away from the first substrate 5. A reflective layer 415 is then formed on the sidewalls of the light-transmitting portions 32. Meanwhile, reflective parts 414 are formed on the surfaces between the light-transmitting portions 32 in the first substrate 51 to form the light-adjusting layer, in which a light-adjusting structure includes a reflective part 414, and then the mask plate is removed. A light-shielding material is filled between the light-transmitting portions 32 to form baffle walls 31, so as to form the anti-peep layer 30 and the light-adjusting layer on the first substrate 51. The side of the anti-peep layer 30 away from the first substrate 51 is then attached to the second substrate 52, so as to realize the production of the anti-peep component 20.

In the production method provided in the embodiments of the present disclosure, the reflective layer 415 formed on the sidewalls of the light-transmitting portions 32 and the reflective parts 414 formed on the surfaces between the light-transmitting portions 32 in the first substrate 51 may be made of the same material in the same process. This is beneficial to reducing the process steps and reducing production costs.

Figure 31:
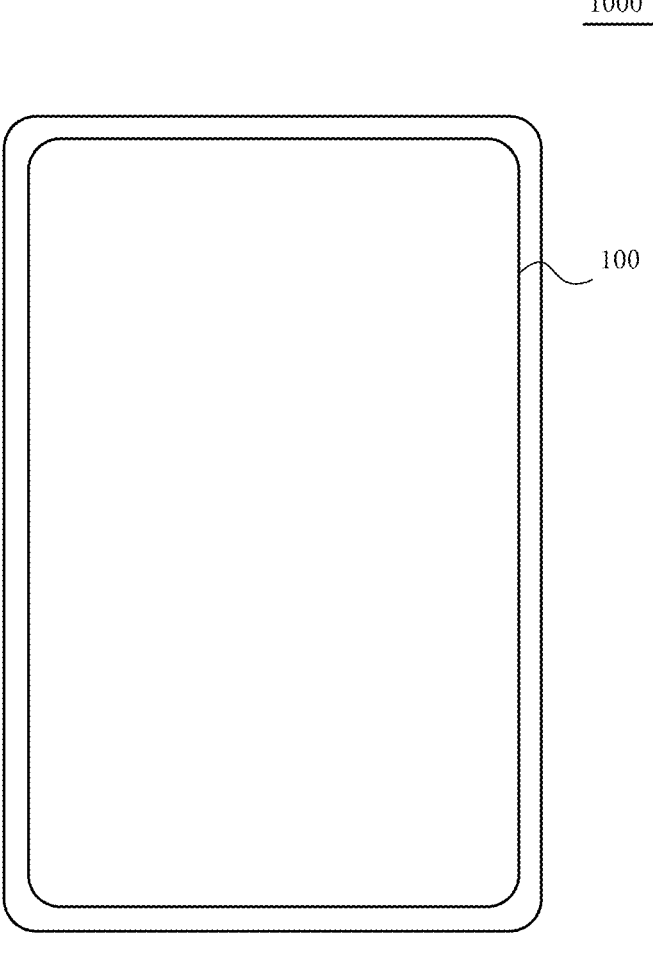
FIG. 31 is a schematic plan view of a display device, according to some embodiments of the present disclosure.

FIG. 31 is a plan view of a display device, according to some embodiments of the present disclosure. The present disclosure also provides a display device 1000, including the display module 100 provided by any of the above embodiments. The embodiment provided in FIG. 31 merely takes a mobile phone as an example to illustrate the display device. It may be understood that the display device provided by the embodiments of the present disclosure may be any electronic device with a display function, including but not limited to the following categories: mobile phones, televisions, laptops, desktop displays, tablet computers, digital cameras, smart bracelets, smart glasses, car displays, medical equipment, industrial control equipment, touch interactive terminals, etc., which is not specifically limited in the present disclosure.

The display device 1000 provided in the embodiments of the present disclosure has the same technical features as the display module 100 provided in the above embodiments, and may therefore solve the same technical problems and achieve the same technical effects.

Compared with the existing technologies, the technical solutions provided by the embodiments of the present disclosure have the following advantages.

In a display module provided by the embodiments of the present disclosure, the anti-peep component includes a light-adjusting layer, and the light-adjusting layer is located between an anti-peep layer and a light-emitting module. That is, light emitted by the light-emitting module enters the anti-peep layer through the light-adjusting layer. The light-adjusting layer includes a plurality of light-adjusting structures, where a light-adjusting structure corresponds to at least one baffle wall, a vertical projection of the light-adjusting structure on a plane where the light-emitting module is located and a vertical projection of a corresponding baffle wall on the plane where the light-emitting module is located at least partially overlap. The light-adjusting structure is configured to change a path of at least part of light directed toward the corresponding baffle wall so that the part of the light is directed toward the light-transmitting portions. That is, through the setting of the light-adjusting structure, the path of part of the light originally directed toward the surface of the baffle wall close to the light-emitting module is changed, so that the part of the light is directed toward the light-transmitting portions. This is beneficial to increase the amount of light entering the light-transmitting portions, thereby facilitating the improvement of the light transmittance, the display brightness, and the display effect.

Correspondingly, the production methods of the display module provided by the embodiments of the present disclosure also have the aforementioned technical effects.

Correspondingly, the display devices provided by the embodiments of the present disclosure also have the aforementioned technical effects.

It should be noted that, in this disclosure, relational terms such as "first" and "second" are merely used to distinguish one entity or operation from another entity or operation, and do not necessarily require or imply any such actual relationship or order between these entities or operations. Moreover, the terms "include", "comprise" or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, the elements defined by the sentence "comprise a . . . " do not exclude the existence of other identical elements in the process, method, article, or device including the element.

The above description provides merely some specific embodiments of the present disclosure, so that those skilled in the art may understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments described herein, but will conform to the widest scope consistent with the principles and innovative features disclosed herein.

What is claimed is:

1. A display module, comprising:
a light-emitting module; and
an anti-peep component, wherein the anti-peep component is located on a light-emitting side of the light-emitting module, the anti-peep component includes an anti-peep layer and a light-adjusting layer, and the light-adjusting layer is located between the anti-peep layer and the light-emitting module, wherein:
the anti-peep layer includes a plurality of baffle walls, and light-transmitting portions are provided between adjacent baffle walls,
the light-adjusting layer includes a plurality of light-adjusting structures, one of the light-adjusting structures corresponds to at least one of the baffle walls, and a vertical projection of a light-adjusting structure on a plane where the light-emitting module is located and a vertical projection of a corresponding baffle wall on the plane where the light-emitting module is located at least partially overlap, and
the anti-peep component further includes a first substrate and a second substrate arranged opposite to each other, wherein the first substrate is located between the anti-peep layer and the light-adjusting layer or between the light-adjusting layer and the light-emitting module, and the second substrate is located on a side of the anti-peep layer not directly facing the light-emitting module.

2. The display module according to claim 1, wherein:
the light-adjusting structure includes a curved light-adjusting structure;
along a direction perpendicular to the plane where the light-emitting module is located, a surface located on at least one side of the curved light-adjusting structure includes a curved surface portion, the curved surface portion is concave toward an interior of the light-adjusting layer, and the curved surface portion forms a concave lens; and
a vertical projection of a surface of a baffle wall directly facing the light-emitting module on the plane where the light-emitting module is located and a vertical projection of a corresponding curved surface portion on the plane where the light-emitting module is located at least partially overlap.

3. The display module according to claim 2, wherein:
the baffle walls are disposed along a first direction; and
a width of the curved surface portion along the first direction is less than or equal to a width of a surface of the corresponding baffle wall directly facing the light-emitting module along the first direction.

4. The display module according to claim 1, wherein:
the light-adjusting structure includes a curved light-adjusting structure;
along a direction perpendicular to the plane where the light-emitting module is located, a surface located on at least one side of the curved light-adjusting structure includes a curved surface portion, the curved surface portion is convex toward a direction away from an interior of the light-adjusting layer, and the curved surface portion forms a convex lens; and
a vertical projection of the curved surface portion on the plane where the light-emitting module is located and a vertical projection of a corresponding light-transmitting portion on the plane where the light-emitting module is located at least partially overlap, and the vertical projection of the curved surface portion on the plane where the light-emitting module is located and a vertical projection of a surface of the corresponding baffle wall directly facing the light-emitting module on the plane where the light-emitting module is located at least partially overlap.

5. The display module according to claim 4, wherein:
the baffle walls are disposed along a first direction; and
a width of the curved surface portion along the first direction is L1, and a distance between centers of surfaces of two adjacent baffle walls directly facing the light-emitting module along the first direction is L2, wherein L1≤L2.

6. The display module according to claim 1, wherein:
the first substrate is located between the anti-peep layer and the light-adjusting layer.

7. The display module according to claim 1, wherein:
the first substrate is located on a side of the light-adjusting layer not directly facing the light-emitting module; and
an isolation layer is provided between the light-adjusting layer and the anti-peep layer.

8. The display module according to claim 1, wherein:
the first substrate is located on a side of the anti-peep layer directly facing the light-emitting module;
the light-adjusting layer is multiplexed as the first substrate; and
an isolation layer is provided between the light-adjusting layer and the anti-peep layer.

9. The display module according to claim 7, wherein:
an adhesive layer is provided between the light-adjusting layer and the anti-peep layer, and the adhesive layer is multiplexed as the isolation layer.

10. The display module according to claim 1, wherein:
the light-adjusting structure includes a rectangle light-adjusting structure;
the first substrate is located on a side of the light-adjusting layer directly facing the light-emitting module; and
a refractive index of the rectangle light-adjusting structure is smaller than a refractive index of the first substrate.

11. The display module according to claim 10, wherein:
a vertical projection of the rectangle light-adjusting structure on the plane where the light-emitting module is located and a vertical projection of a surface of the corresponding baffle wall directly facing the light-emitting module on the plane where the light-emitting module is located at least partially overlap.

12. The display module according to claim 10, wherein:
the light-adjusting layer further includes a light-adjusting
portion, where the light-adjusting portion is at least
filled between rectangle light-adjusting structures, and
a refractive index of the light-adjusting portion is
different from a refractive index of the rectangle light-
adjusting structures.

13. The display module according to claim 1, wherein:
the light-adjusting structure includes a reflective part, and
the reflective part is located on a surface of the corre-
sponding baffle wall directly facing the light-emitting
module.

14. The display module according to claim 1, wherein:
a reflective layer is provided on at least part of a sidewall
of a baffle wall.

15. A method for making a display module, comprising:
forming an anti-peep component, wherein the anti-peep
component includes an anti-peep layer and a light-
adjusting layer, the anti-peep layer includes a plurality
of baffle walls, a plurality of light-transmitting portions
are provided between adjacent baffle walls, the light-
adjusting layer includes a plurality of light-adjusting
structures, and one of the light-adjusting structures
corresponds to at least one baffle wall;
providing a light-emitting module; and
attaching the anti-peep component to a light-emitting side
of the light-emitting module, wherein the light-adjust-
ing layer is located between the anti-peep layer and the
light-emitting module, and a vertical projection of a
light-adjusting structure on a plane where the light-
emitting module is located and a vertical projection of
a corresponding baffle wall on the plane where the
light-emitting module is located at least partially over-
lap,
wherein forming the anti-peep component comprises:
providing a second substrate;
coating a transparent layer on one side of the second
substrate;
forming the light-transmitting portions by embossing
the transparent layer with a roller;
unmolding the roller; and
forming the baffle walls by filling a light-shielding
material between the light-transmitting portions to
form the anti-peep layer.

16. The method according to claim 15, wherein forming
the anti-peep component further comprises:
forming the light-adjusting layer, in which the light-
adjusting structure includes a first light-adjusting struc-
ture, and a surface located on at least one side of the
first light-adjusting structure includes a first curved
surface portion, the first curved surface portion is
concave toward an interior of the light-adjusting layer,
and the first curved surface portion forms a concave
lens, or the light-adjusting structure includes a second
light-adjusting structure, and a surface located on at
least one side of the second light-adjusting structure
includes a second curved surface portion, the second
curved surface portion is convex toward a direction
away from the interior of the light-adjusting layer, and
the second curved surface portion forms a convex lens.

17. The method according to claim 15, wherein:
before forming the baffle walls to form the anti-peep layer,
the method further comprises:
placing a mask plate on a side of the light-transmitting
portions not directly facing the second substrate, the mask plate at least covering surfaces of the light-
transmitting portions not directly facing the second
substrate;
forming a reflective layer on sidewalls of the light-
transmitting portions;
removing the mask plate; and
filling the light-shielding material between the light-
transmitting portions to form the baffle walls to form
the anti-peep layer; and
after forming the baffle walls to form the anti-peep layer,
the method further comprises:
forming reflective parts on a side of the anti-peep layer
not directly facing the second substrate to form the
light-adjusting layer on the side of the anti-peep
layer not directly facing the second substrate,
wherein the light-adjusting structure includes a
reflective part, and the reflective part is located on a
surface of a corresponding baffle wall not directly
facing the second substrate.

18. The method according to claim 15, wherein forming
the anti-peep component comprises:
providing a first substrate;
coating a transparent layer on one side of the first sub-
strate;
embossing the transparent layer with an inverted roller to
form the light-transmitting portions;
unmolding the inverted roller;
placing a mask plate on a side of the light-transmitting
portions not directly facing the first substrate, the mask
plate covering surfaces of the light-transmitting por-
tions not directly facing the first substrate;
forming a reflective layer on sidewalls of the light-
transmitting portions, and forming reflective parts on a
surface of the first substrate located between the light-
transmitting portions to form the light-adjusting layer,
in which the light-adjusting structure includes a reflec-
tive part;
removing the mask plate;
filling a light-shielding material between the light-trans-
mitting portions to form the baffle walls to form the
anti-peep layer, the reflective part being located on a
surface of a corresponding baffle wall directly facing
the first substrate; and
bonding a side of the anti-peep layer not directly facing
the first substrate to a second substrate.

19. A display device, including a display module, and
display module comprising:
a light-emitting module; and
an anti-peep component, wherein the anti-peep compo-
nent is located on a light-emitting side of the light-
emitting module, the anti-peep component includes an
anti-peep layer and a light-adjusting layer, and the
light-adjusting layer is located between the anti-peep
layer and the light-emitting module, wherein:
the anti-peep layer includes a plurality of baffle walls,
and light-transmitting portions are provided between
adjacent baffle walls,
the light-adjusting layer includes a plurality of light-
adjusting structures, one of the light-adjusting struc-
tures corresponds to at least one of the baffle walls,
and a vertical projection of a light-adjusting structure
on a plane where the light-emitting module is located
and a vertical projection of a corresponding baffle
wall on the plane where the light-emitting module is
located at least partially overlap, and
the anti-peep component further includes a first sub-
strate and a second substrate arranged opposite to each other, wherein the first substrate is located between the anti-peep layer and the light-adjusting layer or between the light-adjusting layer and the light-emitting module, and the second substrate is located on a side of the anti-peep layer not directly facing the light-emitting module.

\* \* \* \* \*